(12) United States Patent
Takahashi et al.

(10) Patent No.: US 11,682,992 B2
(45) Date of Patent: Jun. 20, 2023

(54) MOTOR DRIVE DEVICE, COMPRESSOR DRIVE SYSTEM, AND REFRIGERATION CYCLE SYSTEM

(71) Applicant: Mitsubishi Electric Corporation, Tokyo (JP)

(72) Inventors: Kenji Takahashi, Tokyo (JP); Shinya Toyodome, Tokyo (JP); Mitsuo Kashima, Tokyo (JP); Tomohiro Kutsuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 54 days.

(21) Appl. No.: 17/604,769

(22) PCT Filed: May 20, 2019

(86) PCT No.: PCT/JP2019/019927
§ 371 (c)(1),
(2) Date: Oct. 19, 2021

(87) PCT Pub. No.: WO2020/231971
PCT Pub. Date: Nov. 26, 2020

(65) Prior Publication Data
US 2022/0200498 A1 Jun. 23, 2022

(51) Int. Cl.
*H02P 21/00* (2016.01)
*H02P 21/22* (2016.01)
(Continued)

(52) U.S. Cl.
CPC ............ *H02P 21/22* (2016.02); *F25B 49/025* (2013.01); *H02P 21/14* (2013.01); *F25B 2600/021* (2013.01)

(58) Field of Classification Search
CPC ......... H02P 21/22; H02P 21/14; F25B 49/025
(Continued)

(56) References Cited

U.S. PATENT DOCUMENTS

| 4,980,617 A | 12/1990 | Tajima et al. |
| 2010/0045218 A1* | 2/2010 | Tomigashi .............. H02P 6/183 318/400.33 |

(Continued)

FOREIGN PATENT DOCUMENTS

| JP | 1-308184 A | 12/1989 |
| JP | 2006-78095 A | 3/2006 |

(Continued)

OTHER PUBLICATIONS

Office Action dated Mar. 24, 2022, in corresponding Indian patent Application No. 202127052346, 6 pages.
(Continued)

*Primary Examiner* — Erick D Glass
(74) *Attorney, Agent, or Firm* — XSensus LLP

(57) ABSTRACT

A motor drive device: a power conversion unit; a current detection unit that detects a phase current of the alternating-current motor; a position/speed specifying unit that specifies a magnetic pole position and a rotational speed of the alternating-current motor; a d-axis current pulsation generating unit that generates a d-axis current pulsation command based on q-axis current pulsation or a q-axis current pulsation command, which being in synchronization with the q-axis current pulsation or the q-axis current pulsation command and preventing or reducing an increase or decrease in amplitude of the voltage command; and a dq-axis current control unit that generates the voltage command for controlling the phase current on the dq rotating coordinates, which rotate in synchronization with the magnetic pole position, by using the magnetic pole position, the rotational speed, the phase current, the q-axis current pulsation or the q-axis current pulsation command, and the d-axis current pulsation command.

7 Claims, 21 Drawing Sheets

(51) Int. Cl.
*F25B 49/02* (2006.01)
*H02P 21/14* (2016.01)

(58) Field of Classification Search
USPC .................................................. 318/400.02
See application file for complete search history.

(56) References Cited

U.S. PATENT DOCUMENTS

| | | | |
|---|---|---|---|
| 2011/0175556 A1 | 7/2011 | Tobari et al. | |
| 2014/0253001 A1* | 9/2014 | Hinata | H02P 21/24 |
| | | | 318/400.02 |
| 2018/0302013 A1* | 10/2018 | Nakano | H02P 21/06 |

FOREIGN PATENT DOCUMENTS

| | | |
|---|---|---|
| JP | 2011-151883 A | 8/2011 |
| JP | 2017-55466 A | 3/2017 |

OTHER PUBLICATIONS

Notice of Reasons for Refusal dated Jan. 7, 2020, received for JP Application 2019-552649, 9 pages including English Translation.
International Search Report and Written Opinion dated Aug. 20, 2019, received for PCT Application PCT/JP2019/019927, Filed on May 20, 2019, 10 pages including English Translation.

* cited by examiner

MOTOR DRIVE DEVICE, COMPRESSOR DRIVE SYSTEM, AND REFRIGERATION CYCLE SYSTEM

CROSS-REFERENCE TO RELATED APPLICATION

The present application is based on PCT filing PCT/JP2019/019927, filed May 20, 2019, the entire contents of which are incorporated herein by reference.

FIELD

The present invention relates to a motor drive device that drives an alternating-current motor, a compressor drive system, and a refrigeration cycle system.

BACKGROUND

Currently, alternating-current motors are used as power sources for various mechanical devices. Many of the mechanical devices experience periodic variation in load torque, that is, periodic load torque pulsation. In the alternating-current motor, the mechanical device, or the like, the load torque pulsation may cause vibration, noise, or the like. Therefore, various techniques related to vibration suppression control have been studied.

If information on the load torque pulsation is known, it is not difficult to suppress the vibration by feedforward, but normally, the amplitude, the phase, and the like of the load torque pulsation change depending on operating conditions of the mechanical device. It is cumbersome to collect the information on the load torque pulsation in advance, and the feedforward control does not exert an effect when a pulsation different from the data collected in advance occurs. Therefore, a method of detecting and feeding back characteristic information such as vibration and speed pulsation has been studied. In the method based on feedback, a controller automatically determines a control command value that can reduce the vibration, speed pulsation, and the like.

Many vibration suppression control techniques are based on an operation in a region where a power converter for supplying power to the alternating-current motor operates linearly. Patent Literature 1 discloses a technique for continuously switching control such that the vibration suppression control is performed in a linear region of an inverter, and flux weakening control by voltage phase control is performed in an overmodulation region.

CITATION LIST

Patent Literature

Patent Literature 1: Japanese Patent Application Laid-open No. 2017-55466

SUMMARY

Technical Problem

However, according to the above conventional technique, when the vibration suppression control is to be performed at the time of high-speed rotation, it is necessary to make a large margin in a modulation rate by passing a large amount of d-axis current on average. This has caused a problem in that the efficiency of a drive device of the alternating-current motor is impaired.

The present invention has been made in view of the above, and an object of the present invention is to provide a motor drive device capable of reducing or preventing a reduction in efficiency while performing vibration suppression control in an overmodulation region.

Solution to Problem

An aspect of the present invention is directed to a motor drive device that controls driving of an alternating-current motor connected to a mechanical device with periodic load torque pulsation by using dq rotating coordinates. The motor drive device includes: a power conversion unit to convert a direct current voltage into an alternating current voltage on the basis of a voltage command, and output the alternating current voltage to the alternating-current motor; a current detection unit to detect a phase current flowing to the alternating-current motor; a position/speed specifying unit to specify a magnetic pole position and a rotational speed of the alternating-current motor; a d-axis current pulsation generating unit to generate a d-axis current pulsation command on the basis of periodic q-axis current pulsation or a periodic q-axis current pulsation command, the d-axis current pulsation command being in synchronization with the q-axis current pulsation or the q-axis current pulsation command and preventing or reducing an increase or decrease in amplitude of the voltage command; and a dq-axis current control unit to generate the voltage command that controls the phase current on the dq rotating coordinates, which rotate in synchronization with the magnetic pole position, by using the magnetic pole position, the rotational speed, the phase current, the q-axis current pulsation or the q-axis current pulsation command, and the d-axis current pulsation command.

Advantageous Effects of Invention

According to the present invention, the motor drive device can reduce or prevent a reduction in efficiency while performing the vibration suppression control in the overmodulation region.

DESCRIPTION OF EMBODIMENTS

A motor drive device, a compressor drive system, and a refrigeration cycle system according to embodiments of the present invention will now be described in detail with reference to the drawings. Note that the present invention is not limited to the embodiments.

First Embodiment

Figure 1:
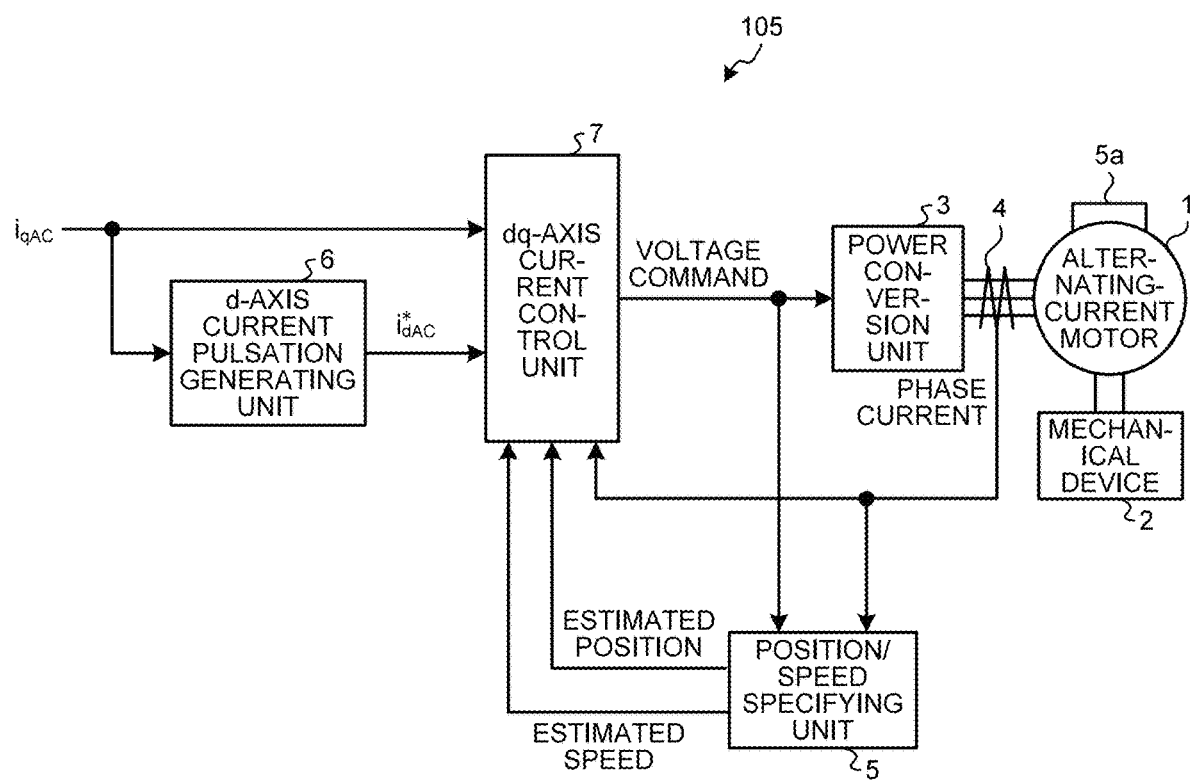
FIG. 1 is a block diagram illustrating an example of a configuration of a motor drive device according to a first embodiment.

FIG. 1 is a block diagram illustrating an example of a configuration of a motor drive device 105 according to a first embodiment of the present invention. The motor drive device 105 is connected to an alternating-current motor 1. The alternating-current motor 1 is mechanically connected to a mechanical device 2. The alternating-current motor 1 is a power source of the mechanical device 2. The mechanical device 2 operates when the motor drive device 105 outputs an alternating current voltage to the alternating-current motor 1.

In the present embodiment, the alternating-current motor 1 is assumed to be an interior permanent magnet synchronous motor, but may be a surface permanent magnet synchronous motor, a wound field synchronous motor, an induction motor, a reluctance synchronous motor, or the like. For convenience of description, the alternating-current motor 1 will be described as a three-phase motor, but may be a motor having another number of phases such as a two-phase motor or a five-phase motor.

In the present embodiment, the mechanical device 2 has periodic load torque pulsation. Various mechanical devices 2 having such a characteristic are conceivable, where a compressor is well known as a typical example thereof. The compressor is a device that compresses a substance such as air or a refrigerant and discharges the compressed substance. A large torque is required for the motor in the step of compressing the substance, and the torque required for the motor decreases in the step of discharging the compressed substance. The compressor is thus known to have the periodic load torque pulsation.

In the compressor, the period of load torque pulsation is determined by a structure of a compression mechanism. For example, in a compressor of a type called a single rotary compressor, a compression step and a discharge step are each performed once while a compression mechanism including one compression chamber makes one rotation. Therefore, the angular frequency of the load torque pulsation of the single rotary compressor is equal to the rotational angular velocity of the compression mechanism. In a compressor of a type called a twin rotary compressor, a compression step and a discharge step are each performed twice while a compression mechanism including two compression chambers makes one rotation. Therefore, the angular frequency of the load torque pulsation of the twin rotary compressor is twice the rotational angular velocity of the compression mechanism. There are various other compressors such as a reciprocating compressor, a scroll compressor, and a screw compressor. The angular frequency of the load torque pulsation is often N times the rotational angular velocity of the compression mechanism. Note that "N" is a positive real number.

Note that although the compressor has been described as the typical example of the mechanical device 2, the mechanical device 2 is not limited thereto. The control of the present embodiment can be applied to any mechanical device as long as the load torque pulsation periodically occurs in the mechanical device. Moreover, in a case where the alternating-current motor 1 and the mechanical device 2 are structurally integrated, the torque ripple of the alternating-current motor 1 itself can also be considered as the load torque pulsation, and thus the control of the present embodiment can be applied to the torque ripple of the alternating-current motor 1.

The motor drive device 105 controls driving of the alternating-current motor 1 connected to the mechanical device 2 by using dq rotating coordinates. The dq rotating coordinates are used in a general vector control method in controlling a motor or the like. A configuration of the motor drive device 105 will be described. As illustrated in FIG. 1, the motor drive device 105 includes a power conversion unit 3, a current detection unit 4, a position/speed specifying unit 5, a d-axis current pulsation generating unit 6, and a dq-axis current control unit 7.

The power conversion unit 3 converts power input from a power source (not illustrated) into power of a prescribed form, and outputs the power. The power conversion unit 3 may have any configuration as long as it can drive the alternating-current motor 1. Here, the power conversion unit 3 will be described as a general-purpose voltage source inverter. The voltage source inverter is a device that switches and converts a direct current voltage supplied from a direct current voltage source into a desired alternating current voltage. Specifically, the power conversion unit 3 converts a direct current voltage into an alternating current voltage on the basis of a voltage command output from the dq-axis current control unit 7. The power conversion unit 3 outputs the alternating current voltage obtained after conversion to the alternating-current motor 1. Note that the power conversion unit 3 may be another type of circuit such as a current source inverter or a matrix converter, or may be a multi-level converter as long as desired alternating current power can be supplied to the alternating-current motor 1.

The current detection unit 4 detects a phase current flowing to the alternating-current motor 1. The type, arrangement, and the like of the current detection unit 4 are not particularly limited. The current detection unit 4 may be a current sensor of a type using a transformer called a current transformer (CT), may be a current sensor of a type using a shunt resistor, or may use a combination of the CT and the shunt resistor. In FIG. 1, the current detection unit 4 is disposed on a wiring between the alternating-current motor 1 and the power conversion unit 3 to measure the phase current flowing to the alternating-current motor 1, but may be disposed at another location. For example, the current detection unit 4 may be disposed inside the power conversion unit 3.

When the current detection unit 4 is disposed inside the power conversion unit 3, a one-shunt current detection method in which a shunt resistor is disposed on an N side of a direct-current bus of the inverter, a lower-arm shunt current detection method in which a shunt resistor is inserted in series with a lower arm of the inverter, or the like can be used. In the one-shunt current detection method and the lower-arm shunt current detection method, the timing at which the current can be detected is limited as compared to the case of using the CT, but the component cost can be reduced.

Moreover, when the alternating-current motor 1 is a three-phase motor in the motor drive device 105, if current sensors are disposed in any two phases, the current of a third phase can be calculated according to Kirchhoff's current law so that the current sensors need not be disposed in all the three phases.

In order to perform vector control on the alternating-current motor 1, a magnetic pole position and rotational speed of the alternating-current motor 1 needs to be detected or estimated. The position/speed specifying unit 5 specifies the magnetic pole position and the rotational speed of the alternating-current motor 1. Specifically, the position/speed specifying unit 5 estimates a magnetic pole position of a rotor (not illustrated) included in the alternating-current motor 1 and rotational speed of the alternating-current motor 1 on the basis of the voltage command output from the dq-axis current control unit 7 and the phase current of the alternating-current motor 1 detected by the current detection unit 4. The magnetic pole position of the rotor is also referred to as a rotor position.

Note that in the motor drive device 105, a position sensor 5a may be used as the position/speed specifying unit 5 if the position sensor 5a can be attached to the alternating-current motor 1. The position sensor 5a may be a rotary encoder or a resolver. Alternatively, instead of the position sensor 5a, a speed sensor called a tachogenerator may be used. However, the position sensor 5a, the speed sensor, or the like may not be usable depending on restrictions such as use environment and cost. Therefore, the present embodiment will be described on the assumption that motor drive device 105 performs position sensorless control. This, however, is not intended to limit the invention, and it is apparent that the motor drive device of the present application may be configured using the position sensor 5a or the speed sensor.

Various methods have been proposed for the position sensorless control of the alternating-current motor 1, but basically any method may be used. For example, a speed estimation method is known in which a state quantity of the alternating-current motor 1 is estimated by a state observing device, and rotational speed is adaptively identified using an estimation error of the state quantity. This method is a method called an adaptive observer, and has an advantage that speed estimation robust against a change in an induced voltage constant can be performed. When the adaptive observer is not used, the magnetic pole position may be estimated simply from the arctangent of a speed electromotive force. This method is called an arctangent method. The arctangent method has a disadvantage that an error occurs in speed estimation when the induced voltage constant has an error, but the calculation is simpler than the adaptive observer. Many other position sensorless control methods have been proposed, but any method may be used as long as the rotational speed and the magnetic pole position of the alternating-current motor 1 can be estimated.

The d-axis current pulsation generating unit 6 determines, that is, generates a d-axis current pulsation command $i_{dAC}{}^*$ from a q-axis current pulsation $i_{qAC}$. The details will be described later because the d-axis current pulsation generating unit 6 is the most important point for performing a characteristic operation in the motor drive device 105. Here, the q-axis current pulsation $i_{qAC}$ may be a command value or a current value actually flowing in the alternating-current motor 1. That is, on the basis of the periodic q-axis current pulsation $i_{qAC}$ or a periodic q-axis current pulsation command $i_{qAC}{}^*$ described later in a third embodiment, the d-axis current pulsation generating unit 6 generates the d-axis current pulsation command $i_{dAC}{}^*$, which is in synchronization with the q-axis current pulsation $i_{qAC}$ or the q-axis current pulsation command $i_{qAC}{}^*$ and prevents or reduces the increase or decrease in the amplitude of the voltage command. The first embodiment assumes that the q-axis current pulsation $i_{qAC}$ is given from a speed pulsation suppression control unit or a vibration suppression control unit (not illustrated). In order to reduce the vibration of the mechanical device 2, it is necessary to cause the motor torque of the alternating-current motor 1 to pulsate in synchronization with the periodic load torque pulsation, and thus it is not uncommon to have q-axis current pulsation in this type of motor drive device 105. Note that the configuration of the speed pulsation suppression control unit, the vibration suppression control unit, or the like is not particularly limited. For example, a control unit that performs feedback control as described in Japanese Patent Application Laid-open No. H01-308184 may be used, or a control unit that performs feedforward compensation by checking the amplitude, phase, and the like of the load torque pulsation in advance may be used. Alternatively, the control unit may be a control unit that observes speed pulsation of the alternating-current motor 1 and performs control to cancel the speed pulsation, or may be a control unit that performs control to cancel acceleration pulsation observed by an acceleration sensor (not illustrated) that is attached to the mechanical device 2. Yet alternatively, the control unit may be a control unit that performs control to reduce pulsation of repeated stress applied to the mechanical device 2 using a force sensor such as a strain gauge (not illustrated).

The dq-axis current control unit 7 controls the phase current flowing to the alternating-current motor 1. As the dq-axis current control unit 7, it is preferable to use a vector control unit on the dq rotating coordinates. A typical vector control unit performs current control on the dq rotating coordinates with respect to the magnetic pole of the rotor. This is because when the phase current is converted into a value on the dq rotating coordinates, the alternating current value becomes a direct current value and the control becomes easier. Because magnetic pole position information is required for the coordinate transformation, the position/speed specifying unit 5 estimates the magnetic pole position. The dq-axis current control unit 7 calculates a dq-axis current command using at least two pieces of information being the q-axis current pulsation $i_{qAC}$ and the d-axis current pulsation command $i_{dAC}{}^*$. In addition to these two pieces of information, the dq-axis current control unit 7 may use information given from another control unit such as a speed control unit or a flux weakening control unit (not illustrated) to determine the dq-axis current command. The dq-axis current control unit 7 performs control such that the dq-axis current command including the d-axis current pulsation command $i_{dAC}{}^*$ matches a dq-axis current, and determines a voltage command for the power conversion unit 3. Specifically, the dq-axis current control unit 7 uses the magnetic pole position and the rotational speed specified by the position/speed specifying unit 5, the phase current detected by the current detection unit 4, the q-axis current pulsation $i_{qAC}$ or the q-axis current pulsation command $i_{qAC}{}^*$, and the d-axis current pulsation command $i_{dAC}{}^*$ generated by the d-axis current pulsation generating unit 6, to generate the voltage command for controlling the phase current on the dq rotating coordinates rotating in synchronization with the magnetic pole position. As a current control method in the dq rotating coordinates, it is common to employ a method of disposing a proportional integral (PI) control unit on each of the d-axis and the q-axis and using in combination a decoupling control unit that compensates an interference component of the dq axis by feedforward. However, any other method may be used as long as the dq-axis current properly follows the dq-axis current command. The dq-axis current control unit 7 determines the voltage command on the dq rotating coordinates, performs coordinate transformation to convert the voltage command on the dq rotating coordinates into a value of a three-phase stationary coordinate by using the magnetic pole position information, and outputs the value to the power conversion unit 3.

Figure 2:
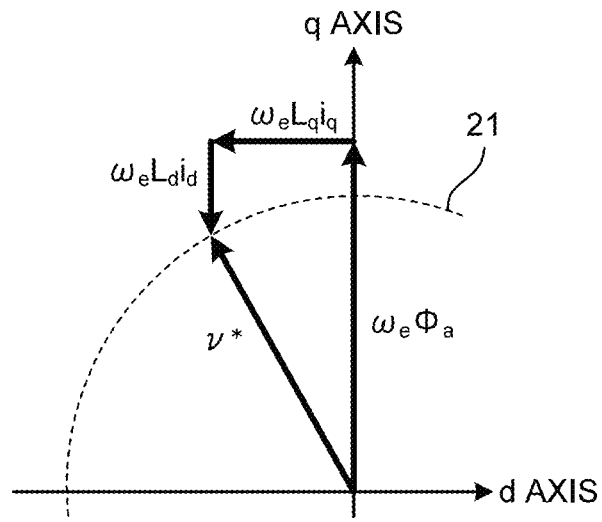
FIG. 2 is a diagram illustrating a voltage vector representing a state of voltage applied to an alternating-current motor when the alternating-current motor rotates in a high-speed region, the alternating-current motor being an interior permanent magnet synchronous motor to be controlled by the motor drive device according to the first embodiment.

Next, the necessity and operation of the d-axis current pulsation generating unit 6 will be described. FIG. 2 is a diagram illustrating a voltage vector representing a state of voltage applied to the alternating-current motor 1 when the alternating-current motor 1 rotates in a high-speed region. The alternating-current motor 1 is the interior permanent magnet synchronous motor to be controlled by the motor drive device 105 according to the first embodiment. In the high-speed region, a voltage drop due to coil resistance of the alternating-current motor 1 is often negligible, so that the voltage drop due to the coil resistance is omitted in FIG. 2. Also, FIG. 2 is the diagram illustrating the voltage vector in a steady state and omits a transient term. In the alternating-current motor 1, as electric angular velocity $\omega_e$ increases, a speed electromotive force $\omega_e \Phi_a$ increases. Here, "$\Phi_a$" represents a dq-axis flux linkage and is a value unique to the motor. The speed electromotive force $\omega_e \Phi_a$ is generated in the direction of the q-axis. In the permanent magnet synchronous motor, the q-axis current and the magnet torque of the motor are proportional to each other. Normally, the mechanical device 2 performs some mechanical work, and thus the alternating-current motor 1 needs to output some torque. A q-axis current $i_q$ flows through the alternating-current motor 1, and a voltage $\omega_e L_q i_q$ is generated in the direction of the d-axis by armature reaction of the q-axis current $i_q$. Here, "$L_q$" represents a q-axis inductance. On the other hand, a d-axis current $i_d$ contributes to a small extent to the torque, and thus is controlled to a smaller value in a low and middle speed region, in which the rotational speed of the alternating-current motor 1 is lower than that in the high-speed region, than in the high-speed region. As a method of determining a d-axis current command in the low and middle speed region, $i_d=0$ control, maximum torque per ampere control (MTPA), and the like are known. On the other hand, in the high-speed region, a vector sum of the speed electromotive force $\omega_e \Phi_a$ and the voltage $\omega_e L_q i_q$ may exceed the maximum output voltage of the power conversion unit 3, and a method called flux weakening control needs to be used.

In general, the maximum voltage of the alternating current voltage that can be output from the power conversion unit 3 to the alternating-current motor 1 is limited, so that when the limit value of the dq-axis voltage is "$V_{om}$", a relationship of an approximate expression of expression (1) is established with respect to the limit value $V_{om}$ in the high-speed region. Note that strictly speaking, the output limit range of the power conversion unit 3 has a hexagonal shape, but is approximated by a circle here. Although the discussion in the present embodiment assumes the approximation with a circle, it is needless to say that the discussion may be made by strictly assuming a hexagon.

[Expression 1]

$$(\Phi_a + L_d i_d)^2 + (L_q i_q)^2 \cong \left(\frac{V_{om}}{\omega_e}\right)^2 \quad (1)$$

In the present embodiment, a circle whose radius centered on the origin is the limit value $V_{om}$, is referred to as a voltage limit circle 21. Note that the limit value $V_{om}$ is known to vary depending on the value of a direct current bus voltage in a case where the power conversion unit 3 is a pulse width modulation (PWM) inverter.

Because the speed electromotive force $\omega_e \Phi_a$ is very large in the high-speed region, in order to increase the q-axis current $i_q$, it is necessary to pass the d-axis current $i_d$ in a negative direction and to keep the amplitude of a voltage command vector v* within the range of the voltage limit circle 21. The method of control for reducing the voltage amplitude by generating a d-axis stator flux Laid in the direction opposite to the dq-axis flux linkage $\Phi_a$ as just described, is generally called flux weakening control. Here, "$L_d$" represents a d-axis inductance. The voltage phase control described in Patent Literature 1 is also one kind of flux weakening control.

The simplest method of flux weakening control is a method of determining a d-axis current command on the basis of a voltage equation. Expression (2) is obtained by solving expression (1) for the d-axis current $i_d$.

[Expression 2]

$$i_d = \frac{-\Phi_a \pm \sqrt{\left(\frac{V_{om}}{\omega_e}\right)^2 - (L_q i_q)^2}}{L_d} \quad (2)$$

However, the flux weakening control for obtaining the d-axis current $i_d$ expressed by expression (2) has a disadvantage that it is sensitive to a change, variation, or the like of the motor constant, and is not used much in the industry.

Integral flux weakening control is used instead of the flux weakening control for obtaining the d-axis current $i_d$ expressed by expression (2). For example, a known method determines the d-axis current command $i_d$* by performing integral control on a difference between the amplitude of the voltage command vector |v*| and the limit value $V_{om}$. In this method, when the amplitude of the voltage command vector |v*| is larger than the limit value $V_{om}$, the d-axis current command $i_d$* is increased in the negative direction, or conversely, when the amplitude of the voltage command vector |v| is smaller than the limit value $V_{om}$, the d-axis current command $i_d$* is decreased. In general, a limiter is appropriately inserted into the d-axis current command $i_d$*. This is to prevent the d-axis current command $i_d$* from becoming excessive and the alternating-current motor 1 from being demagnetized. Moreover, a limiter in a positive direction may be inserted in order to prevent the passage of the positive d-axis current $i_d$ in the low and middle speed region of the rotational speed of the alternating-current motor 1. The limit value in the positive direction is usually equal to zero or a "maximum torque/current command value of current control".

As in Patent Literature 1, there is also known a method of equivalently performing flux weakening control by adding an output of integral control to a control phase and advancing a voltage phase.

However, the integral flux weakening control is not suitable when the q-axis current $i_q$ changes at a high frequency, although it is robust against fluctuations in the constant of the alternating-current motor 1. This is because a control response of the integral control cannot be increased. A current control response in general position sensorless control is about 3000 to 4000 rad/s. Because the flux weakening control is configured as an outer loop of current control, a flux weakening control response can only be designed to be about one-tenth of the current control response considering control stability. Therefore, the flux weakening control response is limited to 300 to 400 rad/s. On the other hand, the performance required for the speed pulsation suppression control and the vibration suppression control is increasing year by year, and it is required to suppress the vibration of 1000 to 2000 rad/s in terms of a disturbance angular frequency. That is, because the upper limit value of the flux weakening control response is too low for the required specifications, it can be said that the high-frequency vibration suppression control cannot be achieved by the conventional integral flux weakening control. Even in the case where the motor drive device is configured using the position sensor 5a, a similar problem can occur in control response design although there is a difference in number. For example, when vibration having a disturbance frequency of 2000 rad/s in the high-speed region is to be suppressed by control with a position sensor, it is necessary to set the current control response to a high gain of 20,000 rad/s or more and the flux weakening control response to a high gain of 2000 rad/s or more. Considering the balance between the device cost and the control performance, there are many cases where the control response cannot be set this high even in the control with the position sensor. Therefore, regardless of the presence or absence of the position sensor 5a, it can be said that the high-frequency vibration suppression control cannot be achieved by the conventional integral flux weakening control.

In addition to the fact that it is said to be difficult to achieve highly responsive torque control in the high-speed region where voltage saturation occurs with the alternating current voltage output from the power conversion unit 3 to the alternating-current motor 1, when the flux weakening control has the problem of control response, it has to be said that it is difficult to perform the vibration suppression control in the high-speed region. For example, Patent Literature 1 discusses a method of smoothly stopping the vibration suppression control without performing the vibration suppression control in the high-speed region.

Note that as mentioned in Patent Literature 1, when motor efficiency is ignored, the vibration suppression control should be possible even in the high-speed region by constantly passing the d-axis current $i_d$ more than necessary. However, this is not realistic. For example, an air-conditioning compressor is subject to strict energy saving regulations, so that it is not possible to constantly pass the d-axis current $i_d$ more than necessary. From a viewpoint other than energy saving as well, it is easy to imagine that an increase in copper loss due to the excessive d-axis current $i_d$ may cause various problems such as adversely affecting the heat dissipation design of the mechanical device 2.

On the other hand, the present embodiment achieves the vibration suppression control in the high-speed region and high-frequency region that has been extremely difficult in the related art. Specifically, the vibration suppression control in the high-speed region and high-frequency region is achieved by decomposing the q-axis current into "a low frequency component including a direct current component" and "a high frequency component including a disturbance angular frequency", and performing the flux weakening control to a necessary small extent as far as possible on the high-frequency q-axis current pulsation $i_{qAC}$.

Figure 3:
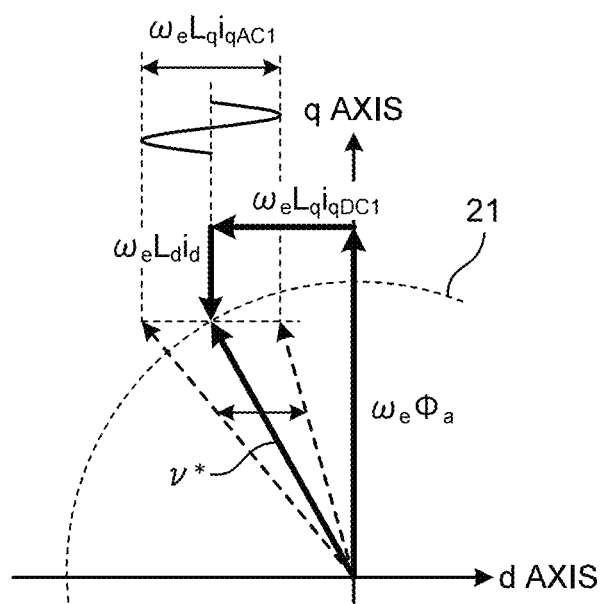
FIG. 3 is a first diagram illustrating a voltage command vector for comparison when vibration suppression control according to the first embodiment is not performed.
Figure 4:
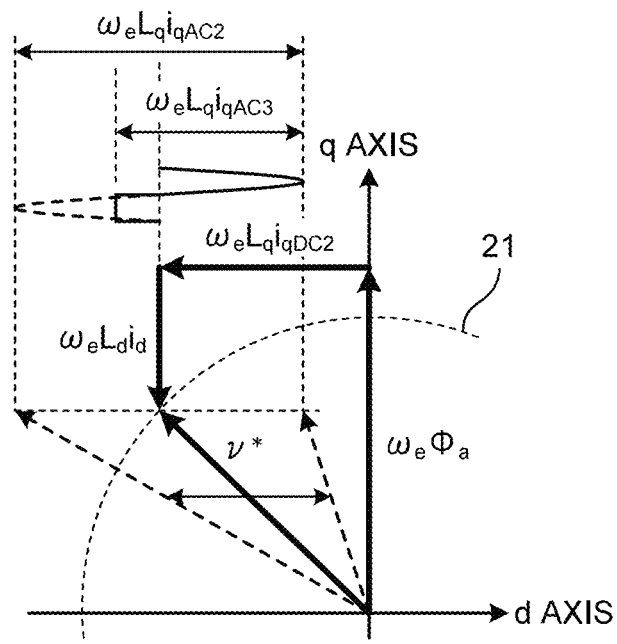
FIG. 4 is a second diagram illustrating a voltage command vector for comparison when the vibration suppression control according to the first embodiment is not performed.
Figure 5:
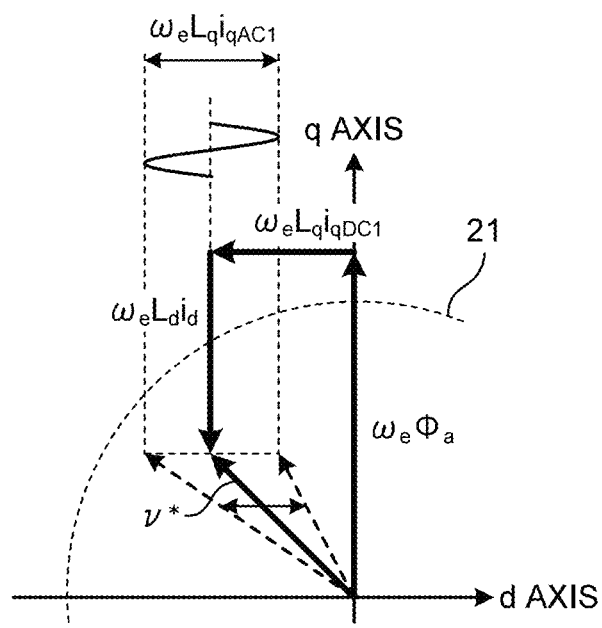
FIG. 5 is a third diagram illustrating a voltage command vector for comparison when the vibration suppression control according to the first embodiment is not performed.
Figure 6:
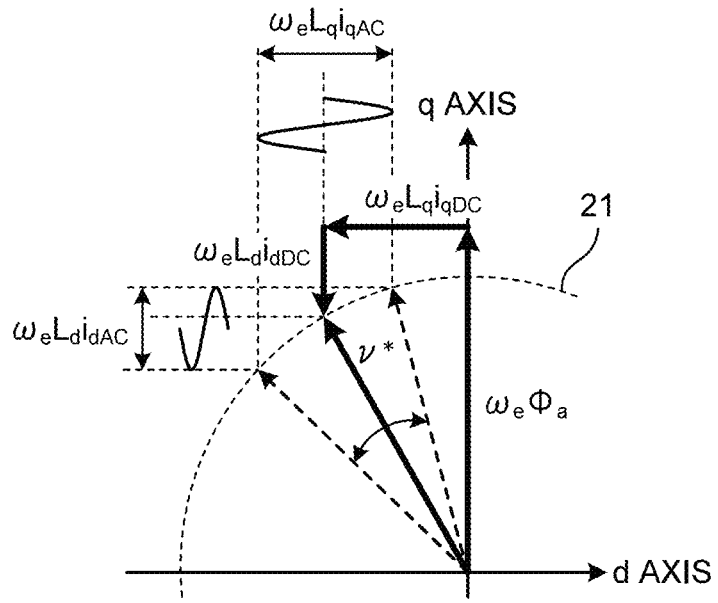
FIG. 6 is a diagram illustrating a voltage command vector when the vibration suppression control according to the first embodiment is performed.

Effects of the present embodiment will be specifically described with reference to the drawings. FIG. 3 is a first diagram illustrating a voltage command vector for comparison when the vibration suppression control according to the first embodiment is not performed. FIG. 4 is a second diagram illustrating a voltage command vector for comparison when the vibration suppression control according to the first embodiment is not performed. FIG. 5 is a third diagram illustrating a voltage command vector for comparison when the vibration suppression control according to the first embodiment is not performed. FIG. 6 is a diagram illustrating a voltage command vector when the vibration suppression control according to the first embodiment is performed. Here, for convenience of description, it is assumed that an integral flux weakening control unit and a feedback vibration suppression control unit are used. In FIG. 3, in order to perform the vibration suppression control, it is assumed that high-frequency q-axis current pulsation $i_{qAC1}$ is to be generated. However, in order not to change the average speed, it is assumed that a low-frequency q-axis current $i_{qDC1}$ including a direct current component needs to be passed constantly. At this time, if there is no large change in the d-axis current $i_d$, the locus of a tip of the voltage command vector v* moves in a direction parallel to the d axis. There is no problem as long as the voltage command vector v* is always within the range of the voltage limit circle 21, but in the high-speed region or high-load region, the voltage command vector v* goes beyond the range of the voltage limit circle 21 at the moment when a sum of the q-axis currents $i_{qDC1}+i_{qAC1}$ increases to be large. A desired q-axis current cannot be passed when the voltage is saturated. When the q-axis current pulsation $i_{qAC1}$ cannot be passed, the feedback vibration suppression control unit tries to pass q-axis current pulsation $i_{qAC2}$ having a larger amplitude as illustrated in FIG. 4. Because the q-axis current pulsation $i_{qAC2}$ is larger than the q-axis current pulsation $i_{qAC1}$, a larger voltage is required to pass the q-axis current pulsation $i_{qAC2}$. Here, in order to reduce the amplitude of the voltage command vector |v*|, the integral flux weakening control unit increases the d-axis current $i_d$ in the negative direction. As a result of such an operation, q-axis current pulsation $i_{qAC3}$ passes eventually. Even if the q-axis current pulsation $i_{qAC1}$ is a sinusoidal signal, the q-axis current pulsation $i_{qAC3}$ is distorted due to the influence of voltage saturation and becomes a non-sinusoidal signal.

When the load torque pulsation is small, the vibration can be reduced to a certain extent without using the vibration suppression control according to the present embodiment. However, when the operation is performed as illustrated in FIG. 4, the motor torque is distorted to generate anomaly noise, and the dq-axis current command is made larger than necessary to cause an increase in the copper loss. Moreover, when the load torque pulsation is large, the q-axis current pulsation $i_{qAC}$ may not be able to be generated as intended, and the vibration may be increased instead.

FIG. 5 illustrates a state in which the high-frequency q-axis current pulsation $i_{qAC1}$ is to be generated with the d-axis current $i_d$ being sufficiently large so as not to cause voltage saturation. If the d-axis current $i_d$ is sufficiently large, the problem as illustrated in FIG. 4 does not occur, but the method of FIG. 5 has a problem in terms of energy saving as described above.

On the other hand, FIG. 6 illustrates a state in which the vibration suppression control according to the present embodiment is performed, and represents a locus of the voltage command vector suitable for passing the high-frequency q-axis current pulsation $i_{qAC}$. Here, it is assumed that the high-frequency q-axis current pulsation $i_{qAC}$ can be expressed as in expression (3).

[Expression 3]

$$i_{qAC}=I_{qAMP}\sin(2\pi f_d t+\delta) \quad (3)$$

Here, "$f_d$" represents the frequency of the disturbance applied to the alternating-current motor 1 by the mechanical device 2, "$I_{qAMP}$" represents the amplitude of the high-frequency q-axis current pulsation, and "δ" represents a phase correction amount. It is assumed that the disturbance frequency $f_d$ is sufficiently higher than a design response of the speed control unit or feedback flux weakening control unit (not illustrated). The amplitude of the high-frequency q-axis current pulsation $I_{qAMP}$ and the phase correction amount δ are parameters that may be determined by the designer of the motor drive device 105. Normally, the amplitude of the high-frequency q-axis current pulsation $I_{qAMP}$ and the phase correction amount δ are determined so as to suppress the vibration of the motor drive device 105, but may be determined using another criterion. The amplitude of the high-frequency q-axis current pulsation $I_{qAMP}$ and the phase correction amount δ may be determined by trial and error evaluation of an actual device, or may be determined using the vibration suppression control described in the aforementioned Japanese Patent Application Laid-open No. H01-308184 or the like.

When the disturbance frequency $f_d$ is sufficiently higher than the design response of the speed control unit (not illustrated) and the alternating-current motor 1 is to be rotated at a constant speed, the low-frequency q-axis current $i_{qDC}$ including the direct current component can be regarded as substantially constant as expressed by expression (4).

[Expression 4]

$$i_{qDC}\cong\text{Constant} \quad (4)$$

Similarly, when the disturbance frequency $f_d$ is sufficiently higher than the design response of the feedback flux weakening control unit (not illustrated) and the alternating-current motor 1 is to be rotated at a constant speed, the low-frequency d-axis current $i_{dDC}$ including the direct current component can also be regarded as substantially constant as expressed by expression (5). Note that because the d-axis current $i_{dDC}$ may be adjusted manually or may be calculated by substituting the d-axis current $i_{dDC}$ into expression (2), the feedback flux weakening control unit need not necessarily be included.

[Expression 5]

$$i_{dDC}\cong\text{Constant} \quad (5)$$

In FIG. 6, the d-axis current pulsation $i_{dAC}$ is given such that the locus of the tip of the voltage command vector coincides with the voltage limit circle 21 in a state in which the low-frequency d-axis current $i_{dDC}$ including the direct current component is passed. The integral flux weakening control described above is known as a method of passing the d-axis current $i_{dDC}$. When the sum of the q-axis currents $i_{qDC}+i_{qAC}$ is large, a larger negative d-axis current is required, and when the sum of the q-axis currents $i_{qDC}+i_{qAC}$ is small, the negative d-axis current should be reduced to reduce the copper loss. Therefore, in the present embodiment, the d-axis current pulsation $i_{dAC}$ is changed in synchronization with the q-axis current pulsation $i_{qAC}$. As a result, the torque distortion is also reduced, and the problem of the response of the integral flux weakening control unit can also be solved. Although details will be described later, there is an advantage of being more robust against fluctuations in the motor constant compared to the flux weakening control of expression (2).

For this reason, in the present embodiment, the d-axis current pulsation generating unit 6 determines the d-axis current pulsation command $i_{dAC}^*$ from the q-axis current pulsation $i_{qAC}$.

Figure 7:
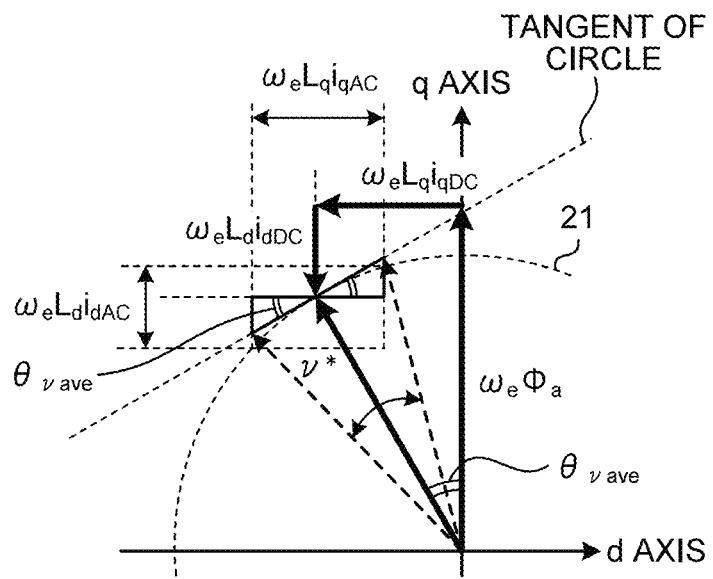
FIG. 7 is a first diagram illustrating a simple method of calculating d-axis current pulsation in a d-axis current pulsation generating unit according to the first embodiment.
Figure 8:
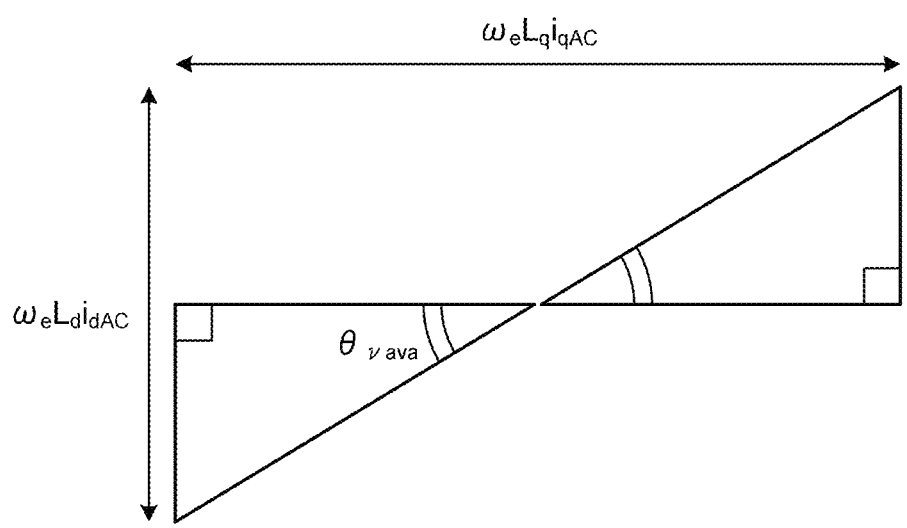
FIG. 8 is a second diagram illustrating a simple method of calculating the d-axis current pulsation in the d-axis current pulsation generating unit according to the first embodiment.

A specific method of calculating the d-axis current pulsation $i_{dAC}$ in the d-axis current pulsation generating unit 6 will be described. Although a calculation formula that causes the locus of the tip of the voltage command vector to completely coincide with the voltage limit circle 21 may be established, a simpler and practical method will be considered here. FIG. 7 is a first diagram illustrating a simple method of calculating the d-axis current pulsation $i_{dAC}$ in the d-axis current pulsation generating unit 6 according to the first embodiment. FIG. 8 is a second diagram illustrating the simple method of calculating the d-axis current pulsation $i_{dAC}$ in the d-axis current pulsation generating unit 6 according to the first embodiment. When a vector sum of a voltage $\omega_e L_q i_{qDC}$, a voltage $\omega_e L_d i_{dDC}$, and the speed electromotive force $\omega_e \Phi_a$ is defined as an average voltage command vector, a tangent is drawn to the voltage limit circle 21 from an intersection of the average voltage command vector and the voltage limit circle 21. Here, an angle formed by the average voltage command vector and the q axis is referred to as an average voltage phase angle $\theta_{vave}$. When the locus of the voltage command vector is to be matched with the tangent, the d-axis current pulsation command $i_{dAC}*$ can be easily determined by focusing on two right triangles illustrated in FIG. 7. FIG. 8 is an enlarged view of the two right triangles in FIG. 7. It is apparent by an elementary geometric calculation that one angle of each of these right triangles is equal to $\theta_{vave}$. Then, from FIG. 8, it can be seen that when the q-axis current pulsation $i_{qAC}$ and the average voltage phase angle $\theta_{vave}$ are known, a desired voltage command vector locus can be obtained if the d-axis current pulsation $i_{dAC}$ expressed in expression (6) can be passed. Note that when the average voltage phase angle $\theta_{vave}$ can be regarded as being substantially constant, expression (6) can be considered as a linear function of the q-axis current pulsation $i_{qAC}$.

[Expression 6]

$$i_{dAC} = -i_{qAC} \frac{L_q}{L_d} \tan(\theta_{vave}) \quad (6)$$

That is, it can also be said that the d-axis current pulsation generating unit 6 generates the d-axis current pulsation command $i_{dAC}*$ on the basis of a result of multiplication of a tangent of the average value of the voltage advance angle and the q-axis current pulsation $i_{qAC}$ or the q-axis current pulsation command $i_{qAC}*$. As illustrated in FIG. 7, under the condition that the q-axis current pulsation $i_{qAC}$ is relatively small, a difference between the circular locus and the tangential locus is small. Therefore, the tangential locus seems to be sufficient in practical use, but an approximation error is not easily ignored when the vibration is very large. In a case where it is desired to allow the locus to further approach the circular locus, it is only required to add a square term, a cubic term, a quartic term, or the like of the q-axis current pulsation $i_{qAC}$ to expression (6) to increase the order of approximation and slightly distort the d-axis current pulsation $i_{dAC}$. In the vicinity of the operating point, the locus considerably close to the circular locus is obtained around the quartic approximation. As described above, the d-axis current pulsation generating unit 6 generates the d-axis current pulsation command $i_{dAC}*$ such that the locus of the vector of the voltage command is maintained in the circumferential direction or the tangential direction of the voltage limit circle 21 having a specified radius, which in this case is set to the limit value $V_{om}$.

Compared to expression (2), expression (6) has a reduced number of motor constants used for calculation. Expression (2) uses the dq-axis flux linkage $\Phi_a$ for calculation, whereas expression (6) does not. Therefore, expression (6) is robust against fluctuations in "$\Phi_a$". Although expressions (2) and (6) both use the dq-axis inductances $L_d$ and $L_q$ for calculation, the influence of the inductance error is smaller in expression (6). Moreover, in expression (2), both the low frequency component and the high frequency component are affected by the inductance error, but in expression (6), only the high frequency component is affected by the inductance error. It can thus be said that the flux weakening control of the present embodiment is more robust against fluctuations in the motor constant than the conventional method using expression (2).

Figure 9:
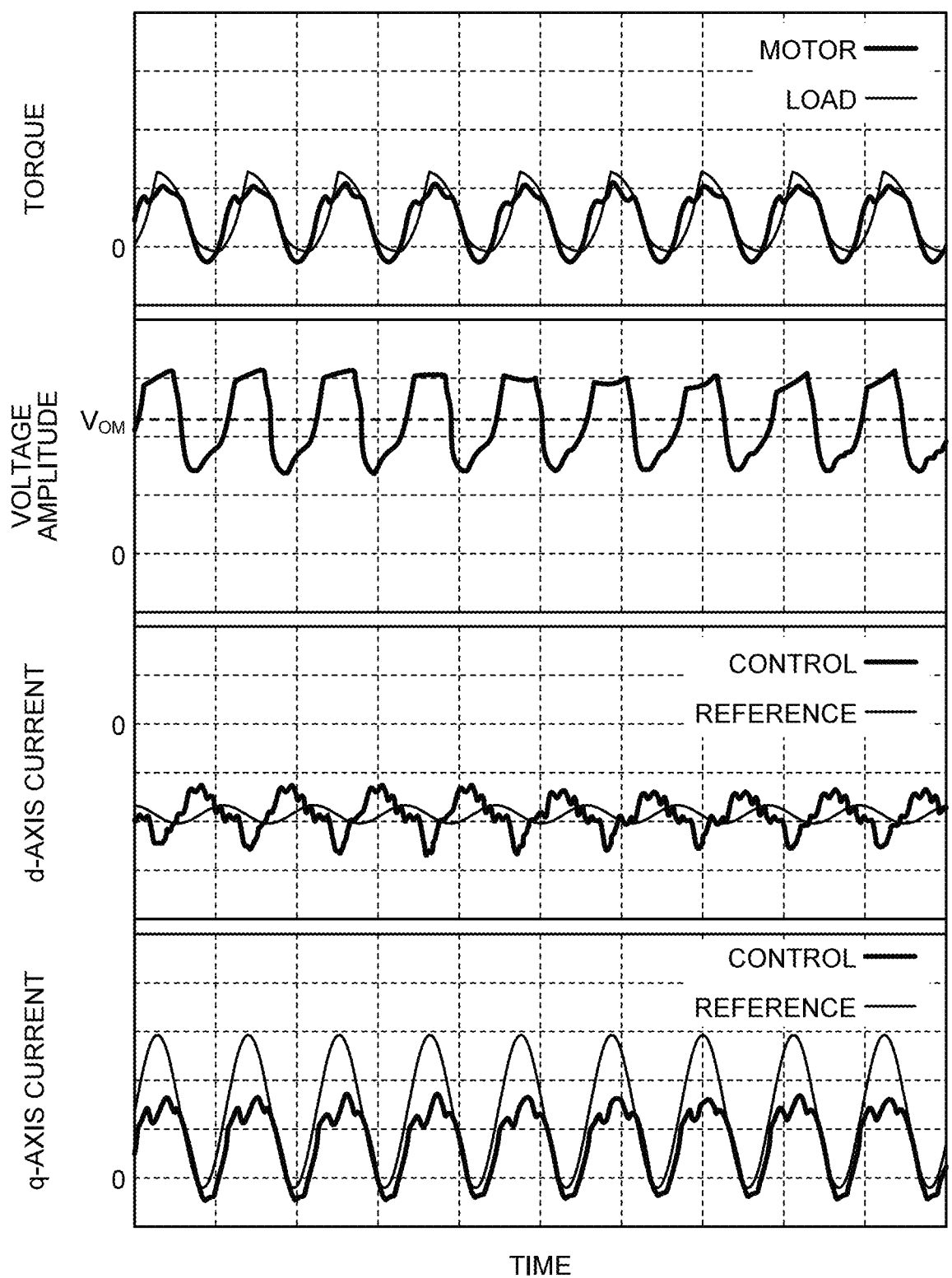
FIG. 9 is a diagram illustrating an example of operation waveforms as a comparative example when the vibration suppression control according to the first embodiment is not performed.
Figure 10:
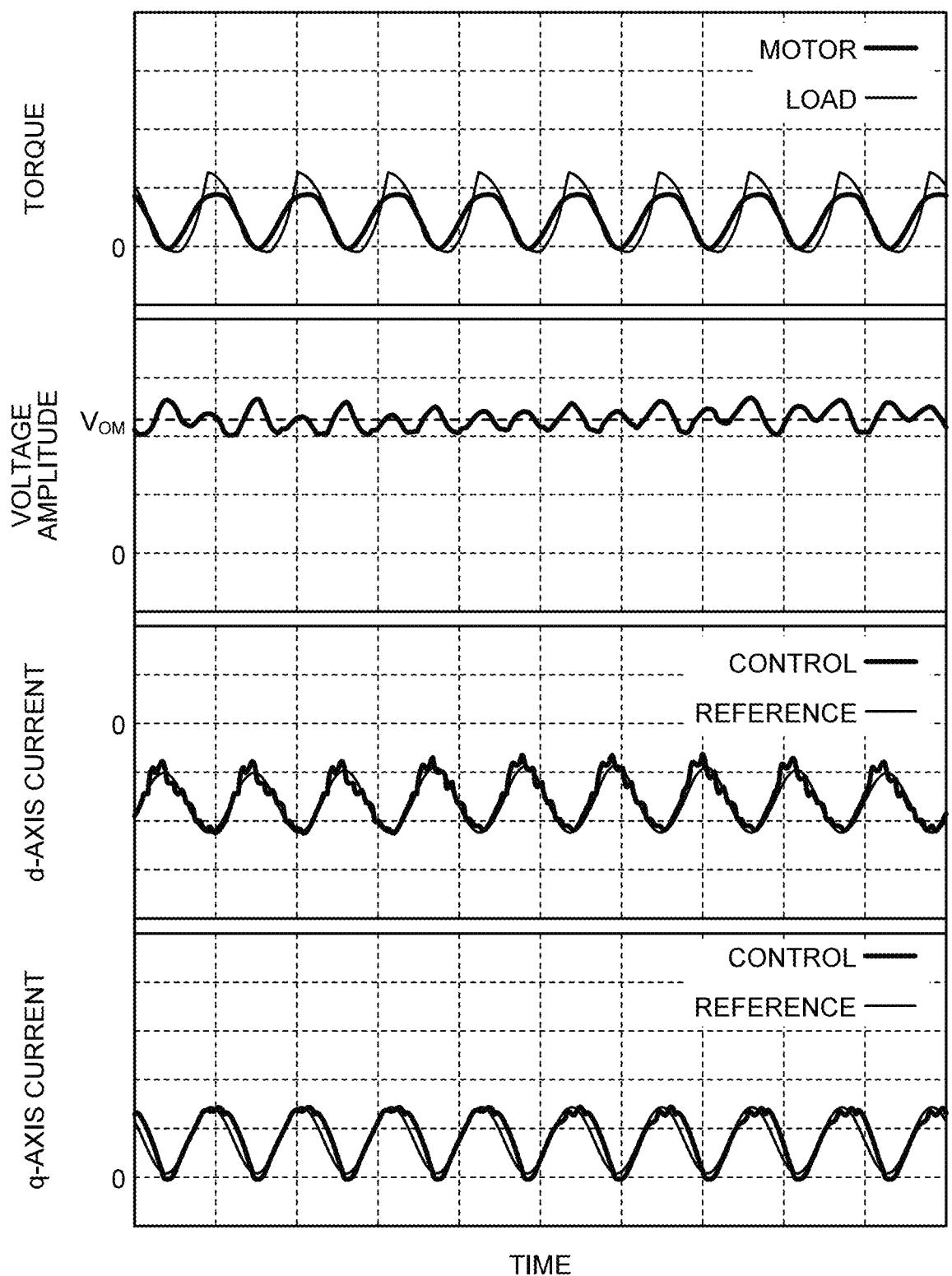
FIG. 10 is a diagram illustrating an example of operation waveforms when the vibration suppression control according to the first embodiment is performed.

FIG. 9 is a diagram illustrating an example of operation waveforms as a comparative example when the vibration suppression control according to the first embodiment is not performed. FIG. 10 is a diagram illustrating an example of operation waveforms when the vibration suppression control according to the first embodiment is performed. FIGS. 9 and 10 are drawn on the same scale. Both waveforms are the waveforms when the mechanical device 2 is a rotary compressor and is operated at a high speed, and the only difference in conditions is whether the vibration suppression control of the present embodiment is applied or not. In the rotary compressor, although depending on the number of compression chambers, load torque pulsation of one cycle to M cycles occurs during one rotation of the alternating-current motor 1. Note that "M" is an integer of 2 or more. Here, the feedback vibration suppression control is used to perform control for matching fundamental wave components of the load torque and the motor torque. In addition, the integral flux weakening control is performed as the flux weakening control of the low frequency component including the direct current component.

First, when the torque waveforms are compared, it can be seen that the fundamental waves of the load torque and the motor torque roughly coincide with each other in FIGS. 9 and 10, but the torque distortion is larger in FIG. 9. This torque distortion is not intended but causes noise, vibration, or the like, and thus is not preferable.

Next, when the voltage amplitudes are compared, it can be seen that the voltage fluctuates erratically in FIG. 9 but is controlled to be roughly constant in FIG. 10. In FIG. 9, the integral flux weakening control attempts to control the voltage amplitude to be constant, but the integral flux weakening control unit does not have sufficient responsiveness to the high-frequency q-axis current pulsation $i_{qAC}$. Therefore, when the high-frequency q-axis current pulsation $i_{qAC}$ is applied, the voltage amplitude cannot be controlled to be constant. This tendency is remarkable when the q-axis current pulsation $i_{qAC}$ is large. On the other hand, in FIG. 10, the flux weakening control for the q-axis current pulsation $i_{qAC}$ is performed separately so that the voltage amplitude can be made constant.

Finally, the d-axis current and the q-axis current will be compared. As described above with reference to FIGS. 3 to 5, a desired q-axis current cannot be passed when the voltage is saturated. When the desired q-axis current cannot be passed, the feedback vibration suppression control unit attempts to increase the pulsation of the q-axis current command. As a result, the q-axis current command is very large in FIG. 9. However, a higher voltage is required to pass a large q-axis current. Here, in order to reduce the amplitude of the voltage command vector $|v*|$, the integral flux weakening control unit increases the d-axis current $i_d$ in the negative direction. As a result, when absolute value averages of the d-axis current in FIGS. 9 and 10 are compared, the absolute value average is larger in FIG. 9. However, although the absolute value average of the d-axis current is increased, the q-axis current cannot follow the command value, and distortion occurs at the peaks of the waveform. This distortion of the q-axis current causes torque distortion. In FIG. 9, the absolute value average of the d-axis current increases in addition to the increase in the amplitude of the q-axis current command due to the influence of voltage saturation, so that a copper loss (not illustrated) increases and efficient operation cannot be performed. On the other hand, in FIG. 10, because the appropriate d-axis current pulsation $i_{dAC}$ is calculated, the amplitude of the q-axis current command does not increase, and the absolute value average of the d-axis current does not increase. Therefore, the copper loss is reduced in FIG. 10 as compared to FIG. 9, and efficient vibration suppression control can be implemented.

For these reasons, when the vibration suppression control is performed, it can be said that it is a reasonable method to perform the flux weakening control by separating the low frequency component and the high frequency component.

Figure 11:
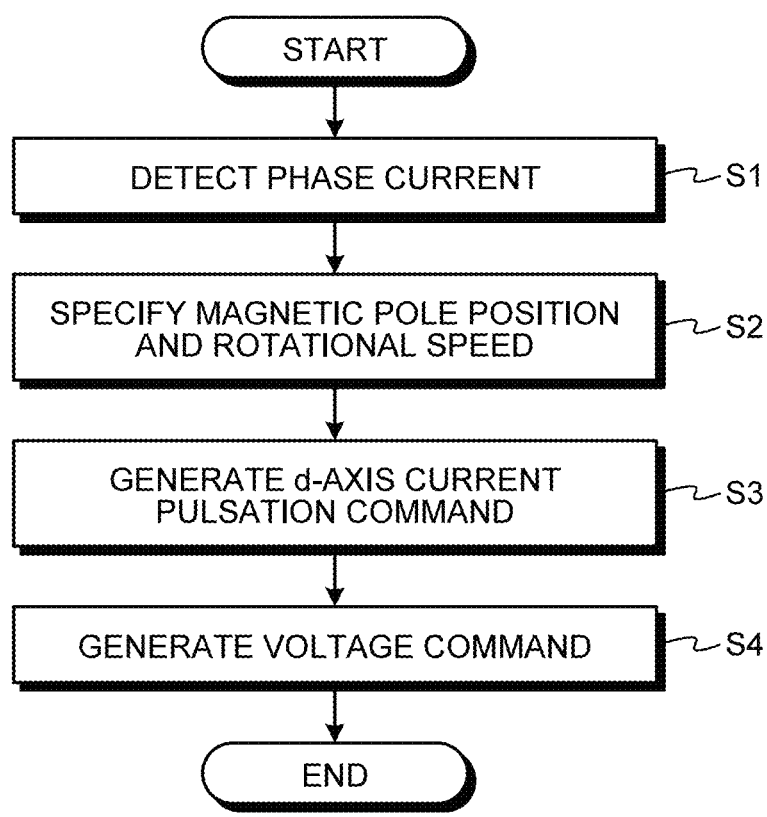
FIG. 11 is a flowchart illustrating an operation of the motor drive device according to the first embodiment.

An operation of the motor drive device 105 will be described with reference to a flowchart. FIG. 11 is a flowchart illustrating the operation of the motor drive device 105 according to the first embodiment. The current detection unit 4 detects a phase current of the alternating-current motor 1 (step S1). The position/speed specifying unit 5 specifies the magnetic pole position and the rotational speed of the alternating-current motor 1 on the basis of a voltage command output from the dq-axis current control unit 7 and the phase current of the alternating-current motor 1 detected by the current detection unit 4 (step S2). The d-axis current pulsation generating unit 6 generates the d-axis current pulsation command $i_{dAC}*$ using the q-axis current pulsation $i_{qAC}$ (step S3). The dq-axis current control unit 7 determines a dq-axis current command using the magnetic pole position and the rotational speed of the alternating-current motor 1 specified by the position/speed specifying unit 5, the phase current of the alternating-current motor 1 detected by the current detection unit 4, the q-axis current pulsation $i_{qAC}$, and the d-axis current pulsation command $i_{dAC}*$ generated by the motor drive device 105, and generates a voltage command for controlling the current passing through the alternating-current motor 1 on the dq rotating coordinates that rotate in synchronization with the magnetic pole position (step S4).

As described above, according to the present embodiment, the d-axis current pulsation generating unit 6 in the motor drive device 105 generates the d-axis current pulsation command $i_{dAC}*$ that is in synchronization with the q-axis current pulsation $i_{qAC}$ and prevents or reduces the increase or decrease in the amplitude of the voltage command vector due to the q-axis current pulsation $i_{qAC}$. The dq-axis current control unit 7 generates the voltage command for the power conversion unit 3 using the d-axis current pulsation command $i_{dAC}*$. As a result, the motor drive device 105 can prevent a reduction in efficiency while efficiently performing the vibration suppression control with the small d-axis current $i_d$ in the overmodulation region. The motor drive device 105 can perform the vibration suppression control in the high-speed region by preventing or reducing the increase or decrease in the amplitude of the voltage command.

Second Embodiment

A second embodiment will describe a specific hardware configuration of the motor drive device 105 described in the first embodiment.

Figure 12:
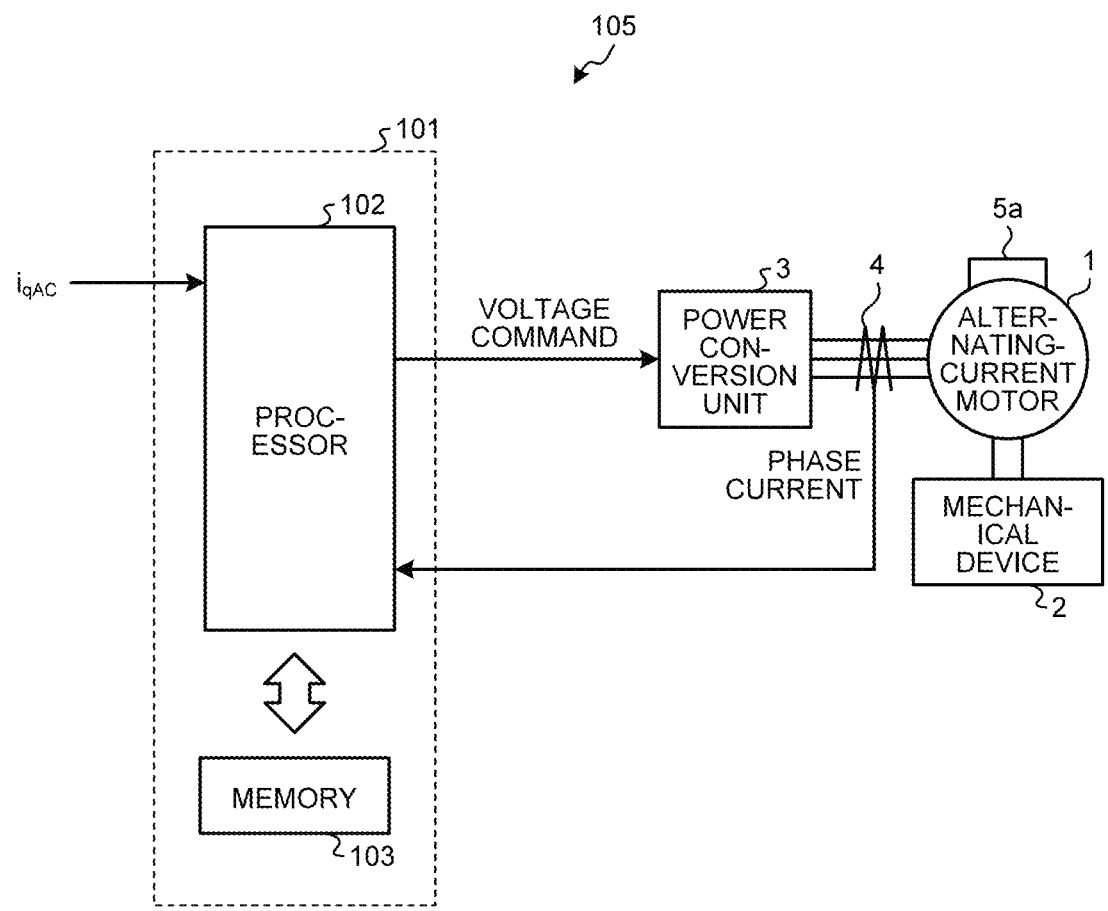
FIG. 12 is a diagram illustrating an example of a hardware configuration of the motor drive device according to a second embodiment.

FIG. 12 is a diagram illustrating an example of the hardware configuration of the motor drive device 105 according to the second embodiment. In FIG. 12, parts identical or corresponding to those in the configuration illustrated in FIG. 1 will be denoted by the same reference numerals as those in FIG. 1.

In the motor drive device 105, the d-axis current pulsation generating unit 6 and the dq-axis current control unit 7 are implemented by control circuitry 101. The control circuitry 101 includes a processor 102 and a memory 103 as hardware. Although not illustrated, the memory 103 includes a volatile storage device such as a random access memory and a nonvolatile auxiliary storage device such as a flash memory. Note that although not illustrated, the memory 103 may include the volatile storage device such as the random access memory and an auxiliary storage device such as a hard disk instead of the nonvolatile auxiliary storage device. The processor 102 executes a program input from the memory 103. Because the memory 103 includes the auxiliary storage device and the volatile storage device, the program is input from the auxiliary storage device to the processor 102 via the volatile storage device. The processor 102 may also output data such as a calculation result to the volatile storage device of the memory 103, or may save the data in the auxiliary storage device via the volatile storage device.

Various modes have been studied for the power conversion unit 3 and the current detection unit 4, but basically any mode may be used therefor. As for the position/speed specifying unit 5, the position sensor 5a may be included, but basically any type of sensor may be used. Although not illustrated here, the motor drive device 105 may further include a voltage detection unit that detects an input/output voltage of the power conversion unit 3, a direct current bus voltage, and the like.

Basically any method may be used as a method of transmitting and receiving data between the components. The components may transmit data by a digital signal or an analog signal. The digital signal may be communicated by parallel communication or serial communication. The analog signal and the digital signal may be converted as appropriate by a converter (not illustrated). For example, in a case where the phase current detected by the current detection unit 4 is expressed by an analog signal, the analog signal is converted into a digital signal by an analog to digital (A/D) converter (not illustrated), and data is transmitted to the processor 102. The A/D converter (not illustrated) may be inside the control circuitry 101 or inside the current detection unit 4. Similarly, the signal of the voltage command transmitted from the processor 102 to the power conversion unit 3 may be an analog signal or a digital signal. The processor 102 may also include a modulation unit such as a carrier comparison modulation unit or a spatial vector modulation unit, and may transmit a pulse train after modulation as the voltage command from the processor 102 to the power conversion unit 3.

A similar method applies to the communication with the position sensor 5a, the voltage detection unit, and the control circuitry 101.

The processor 102 performs calculation of expression (6) on the basis of the q-axis current pulsation $i_{qAC}$ of the alternating-current motor 1, and calculates the d-axis current pulsation command $i_{dAC}*$. The processor 102 then performs current control on the basis of the dq-axis current pulsation and determines the voltage command, thereby implementing the vibration suppression control in the high-speed region. Note that the q-axis current pulsation $i_{qAC}$ may be a command value or a detection value. The q-axis current pulsation $i_{qAC}$ may be given from another computer (not illustrated) or may be calculated inside the processor 102. In addition, the processor 102 may perform other calculation processing if having the capacity to do so. That is, the processor 102 may perform other control calculation processing such as a speed control calculation, a vibration suppression control calculation, or an integral flux weakening control calculation not illustrated in FIGS. 1 and 12.

Third Embodiment

The configuration of the motor drive device 105 illustrated in FIG. 1 described in the first embodiment is the minimum configuration. A third embodiment will specifically describe an example of the configuration of the motor drive device more suitable for practical use. Differences from the first embodiment will be described.

Figure 13:
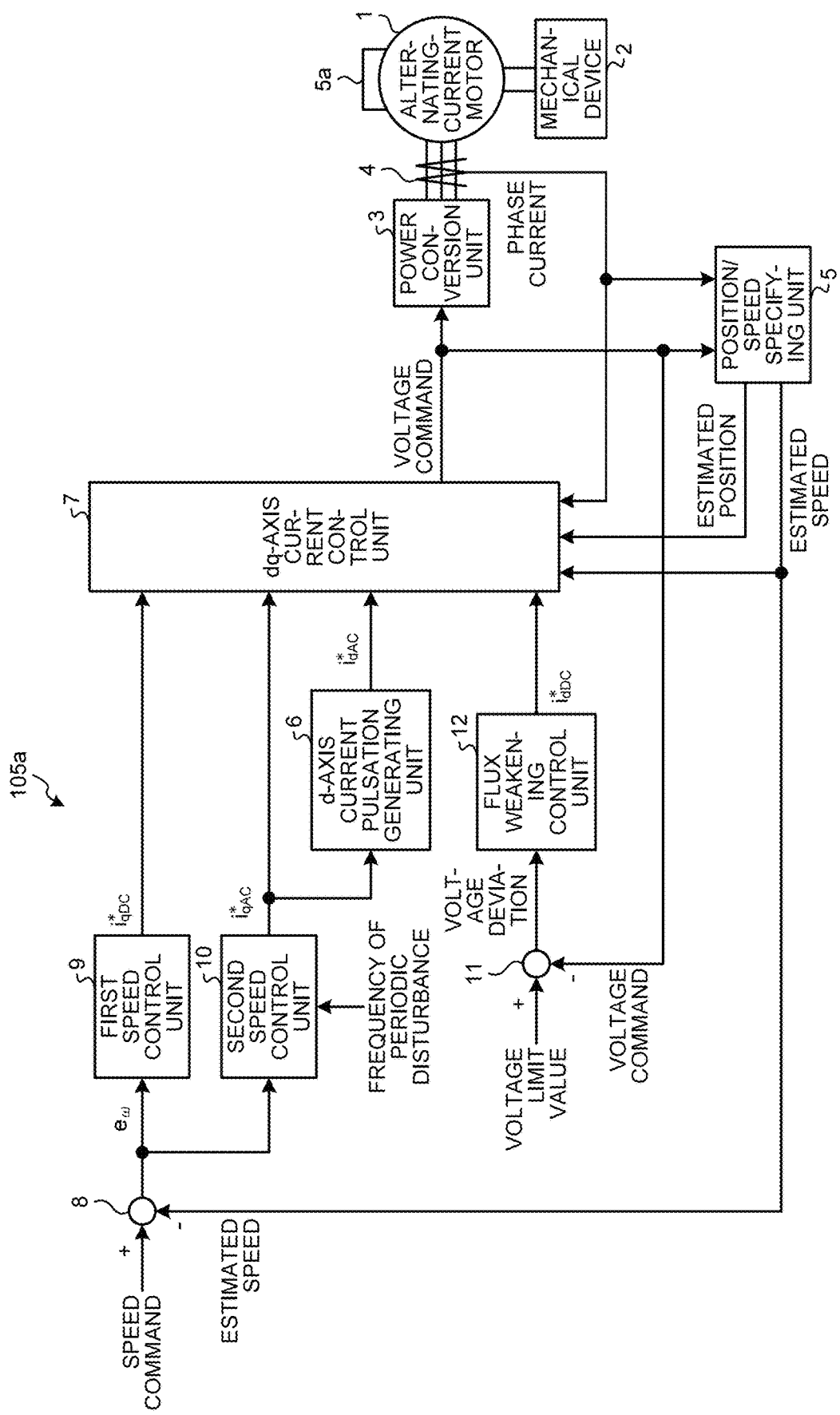
FIG. 13 is a block diagram illustrating an example of a configuration of a motor drive device according to a third embodiment.

FIG. 13 is a block diagram illustrating an example of the configuration of a motor drive device 105a according to the third embodiment. The motor drive device 105a is obtained by adding a subtraction unit 8, a first speed control unit 9, a second speed control unit 10, a subtraction unit 11, and a flux weakening control unit 12 to the motor drive device 105 of the first embodiment illustrated in FIG. 1. Note that the position/speed specifying unit 5 may have any configuration but here estimates the magnetic pole position and the rotational speed of the alternating-current motor 1 from the phase current of the alternating-current motor 1 detected by the current detection unit 4 and the voltage command input to the power conversion unit 3.

The subtraction unit 8 calculates a difference between a speed command indicating the rotational speed of the alternating-current motor 1 and an estimated speed being the rotational speed estimated by the position/speed specifying unit 5, and outputs the difference as a speed deviation $e_\omega$.

The first speed control unit 9 controls the average speed of the alternating-current motor 1 using the speed deviation $e_\omega$. The first speed control unit 9 generates a q-axis current command $i_{qDC}*$ that has a lower frequency than the q-axis current pulsation $i_{qAC}$ or the q-axis current pulsation command $i_{qAC}*$ and controls the average speed of the alternating-current motor 1. The first speed control unit 9 typically performs feedback control, but may perform feedforward control. The first speed control unit 9 determines the q-axis current command $i_{qDC}*$ on the low frequency side including the direct current component such that the speed deviation $e_\omega$ equals zero. It is known that when a PI control unit is used as the first speed control unit 9, a steady state speed deviation with respect to a step response equals zero. Although the PI control unit has a simple gain design, another control law may be used. However, the first speed control unit 9 has a restriction in response design, and it is considered that the first speed control unit 9 alone cannot suppress high-frequency speed pulsation.

A current control response in general position sensorless control is about 3000 to 4000 rad/s. Because the first speed control unit 9 is configured as an outer loop of current control, a speed control response of the first speed control unit 9 can only be designed to be about one-tenth of the current control response considering control stability. Therefore, the speed control response of the first speed control unit 9 is limited to 300 to 400 rad/s. In a case where the angular frequency of the load torque pulsation of the mechanical device 2 is higher than the speed control response, the first speed control unit 9 alone cannot suppress the speed pulsation so that the second speed control unit 10 is required.

The second speed control unit 10 generates the q-axis current pulsation command $i_{qAC}*$ for suppressing speed pulsation caused by the load torque pulsation. The second speed control unit 10 is referred to as a vibration suppression control unit, a speed pulsation suppression control unit, or the like, and various methods have already been proposed therefor. Here, for convenience of description, a feedback vibration suppression technique described in the aforementioned Japanese Patent Application Laid-open No. H01-308184 will be described as an example. Note that characteristics of the load torque pulsation may be evaluated in advance, and feedforward compensation may be performed on the basis of a result of the evaluation performed in advance. However, because the feedback method requires less adjustment, the description will be made assuming that the feedback method is employed.

In the method disclosed in the aforementioned Japanese Patent Application Laid-open No. H01-308184, the second speed control unit 10 performs Fourier series expansion on the speed deviation $e_\omega$ at a frequency of a periodic disturbance on the condition that the frequency of the periodic disturbance is known, and extracts a cosine component $E_{\omega\ cos}$ and a sine component $E_{\omega\ sin}$. For example, when the mechanical device 2 is a rotary compressor, the cosine component $E_{\omega\ cos}$ and the sine component $E_{\omega\ sin}$ of the speed deviation $e_\omega$ are calculated by expressions (7) and (8). Note that although it is apparent to those skilled in the art, the integration operation and the division processing of expressions (7) and (8) may be substituted by approximate integration using a low-pass filter.

[Expression 7]

$$E_{\omega cos} = \frac{1}{\pi}\int_0^{2\pi} e_\omega \cos(k\theta_m)d\theta_m \tag{7}$$

[Expression 8]

$$E_{\omega sin} = \frac{1}{\pi}\int_0^{2\pi} e_\omega \sin(k\theta_m)d\theta_m \tag{8}$$

In expressions (7) and (8), "k" represents the number of compression chambers. For example, a single rotary compressor has k=1, and a twin rotary compressor has k=2.

Next, the second speed control unit 10 performs integral control on each of the cosine component $E_{\omega\ cos}$ and the sine component $E_{\omega\ sin}$. The control is simple because the cosine component $E_{\omega\ cos}$ and the sine component $E_{\omega\ sin}$ are direct current values. When "$I_{qcos}$" and "$I_{q\ sin}$" represent results of the respective integral controls, the second speed control unit 10 can determine the q-axis current pulsation command $i_{qAC}*$ by restoring these to alternating current values. Expression (9) is an example of the arithmetic expression.

[Expression 9]

$$i*_{qAC} = -I*_{qcos}\sin(k\theta_m) + I*_{q\ sin}\cos(k\theta_m) \tag{9}$$

The above is the method of vibration suppression control disclosed in the aforementioned Japanese Patent Application Laid-open No. H01-308184. This method is simple and highly effective, and thus is widely used in industry.

Note that although it is apparent to those skilled in the art, the control block diagram can be modified as appropriate. For example, because the q-axis current and the motor torque are roughly proportional in the permanent magnet synchronous motor, the outputs of the first speed control unit 9 and the second speed control unit 10 may be expressed in the dimension of the torque instead of the dimension of the q-axis current.

In the low and middle speed region where the voltage is not saturated by the alternating current voltage output from the power conversion unit 3 to the alternating-current motor 1, the two control units being the first speed control unit 9 and the second speed control unit 10 are sufficient. Meanwhile, in the high-speed region where the voltage is saturated, a desired q-axis current cannot be passed unless flux weakening control is performed. The flux weakening control unit 12 is thus required. The flux weakening control unit 12 generates a d-axis current command $i_{dAC}$* having a lower frequency than the d-axis current pulsation command $i_{dAC}$* for maintaining the amplitude of the voltage command at a value less than or equal to a specified value. Various proposals have been made for the flux weakening control, and basically any method may be used such as the integral flux weakening control described in detail in the first embodiment. In this method, first, the subtraction unit 11 calculates a voltage deviation between a voltage limit value and the amplitude of the voltage command. The flux weakening control unit 12 performs integral control using the voltage deviation calculated by the subtraction unit 11 as an input. Note that a block for calculating the amplitude of the voltage command from the vector of the voltage command is not illustrated. The flux weakening control unit 12 determines the d-axis current command $i_{dDC}$* on the low frequency side including the direct current component. As with the first speed control unit 9, the flux weakening control unit 12 has a restriction in the control response, and thus the flux weakening control response is limited to 300 to 400 rad/s. In a case where the angular frequency of the load torque pulsation of the mechanical device 2 is higher than the flux weakening control response, the flux weakening control unit 12 alone cannot follow a voltage change due to the q-axis current pulsation command $i_{qAC}$* generated by the second speed control unit 10, so that appropriate vibration suppression control cannot be performed.

Therefore, the motor drive device 105a calculates the d-axis current pulsation command $i_{dAC}$* from the q-axis current pulsation command $i_{qAC}$* using the d-axis current pulsation generating unit 6. On the basis of the q-axis current pulsation command $i_{qAC}$*, the d-axis current pulsation generating unit 6 generates the d-axis current pulsation command $i_{dAC}$* that is in synchronization with the q-axis current pulsation command $i_{qAC}$* and prevents or reduces the increase or decrease in the amplitude of the voltage command. The motor drive device 105a increases or decreases the d-axis current in accordance with the pulsation of the q-axis current to maintain the locus of the tip of the voltage command vector in the tangential direction or the circumferential direction of the voltage limit circle 21. The motor drive device 105a can thus perform the vibration suppression control with high efficiency and high performance.

The dq-axis current control unit 7 determines the dq-axis current command from the magnetic pole position, the rotational speed, the phase current, the d-axis current command $i_{dDC}$*, the d-axis current pulsation command $i_{dAC}$*, the q-axis current command $i_{qDC}$*, and the q-axis currentpulsation command $i_{qAC}$*. The dq-axis current control unit 7 then performs current control on the dq rotating coordinates and determines a dq-axis voltage command. The dq-axis current control unit 7 generates a voltage command by performing coordinate transformation on the dq-axis voltage command to obtain a command value on three-phase coordinates, and outputs the voltage command to the power conversion unit 3 to drive the alternating-current motor 1.

Figure 14:
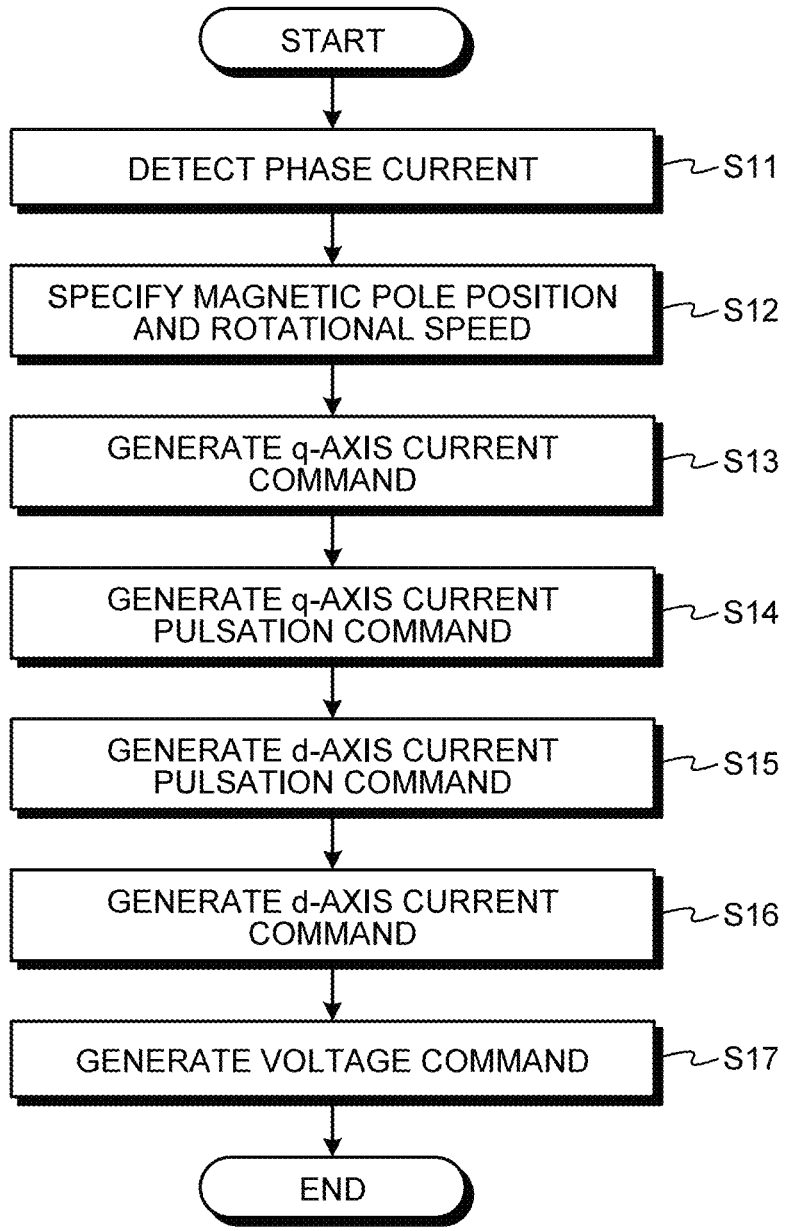
FIG. 14 is a flowchart illustrating an operation of the motor drive device according to the third embodiment.

An operation of the motor drive device 105a will be described with reference to a flowchart. FIG. 14 is the flowchart illustrating the operation of the motor drive device 105a according to the third embodiment. The current detection unit 4 detects the phase current of the alternating-current motor 1 (step S11). The position/speed specifying unit 5 specifies the magnetic pole position and the rotational speed of the alternating-current motor 1 on the basis of the voltage command output from the dq-axis current control unit 7 and the phase current of the alternating-current motor 1 detected by the current detection unit 4 (step S12). The first speed control unit 9 generates the q-axis current command $i_{qDC}$* using the speed deviation $e_\omega$ (step S13). The second speed control unit 10 generates the q-axis current pulsation command $i_{qAC}$* for suppressing the speed pulsation caused by the load torque pulsation (step S14). The d-axis current pulsation generating unit 6 generates the d-axis current pulsation command $i_{dAC}$* using the q-axis current pulsation command $i_{qAC}$* (step S15). The flux weakening control unit 12 generates the d-axis current command $i_{dDC}$* for maintaining the amplitude of the voltage command at a value less than or equal to a specified value (step S16). The dq-axis current control unit 7 determines the dq-axis current command using the magnetic pole position and the rotational speed of the alternating-current motor 1 specified by the position/speed specifying unit 5, the phase current of the alternating-current motor 1 detected by the current detection unit 4, the q-axis current command $i_{qDC}$*, the q-axis current pulsation command $i_{qAC}$*, the d-axis current pulsation command $i_{dAC}$*, and the d-axis current command $i_{qDC}$*, and generates the voltage command for controlling the current passing through the alternating-current motor 1 on the dq rotating coordinates that rotate in synchronization with the magnetic pole position (step S17).

Note that as for a hardware configuration of the motor drive device 105a, the subtraction unit 8, the first speed control unit 9, the second speed control unit 10, the subtraction unit 11, and the flux weakening control unit 12 are implemented by the control circuitry 101 as with the d-axis current pulsation generating unit 6 and the dq-axis current control unit 7 of the motor drive device 105 of the first embodiment.

As described above, according to the present embodiment, in the motor drive device 105a, the first speed control unit 9 generates the q-axis current command $i_{qDC}$*, the second speed control unit 10 generates the q-axis current pulsation command $i_{qAC}$*, and the flux weakening control unit 12 generates the d-axis current command $i_{dDC}$*. In this case as well, effects similar to those of the first embodiment can be obtained.

Fourth Embodiment

In the first to third embodiments, the d-axis current pulsation generating unit 6 determines the d-axis current pulsation command $i_{dAC}$* such that the locus of the tip of the voltage command vector coincides with the voltage limit circle 21 as much as possible. However, in a state where the voltage is not saturated, the flux weakening control is not required in the first place so that the copper loss of the alternating-current motor 1 can be reduced by setting the d-axis current pulsation command $i_{dAC}^*$ to zero. A fourth embodiment will describe a case where the copper loss of the alternating-current motor 1 is reduced in the state where the voltage is not saturated.

Figure 15:
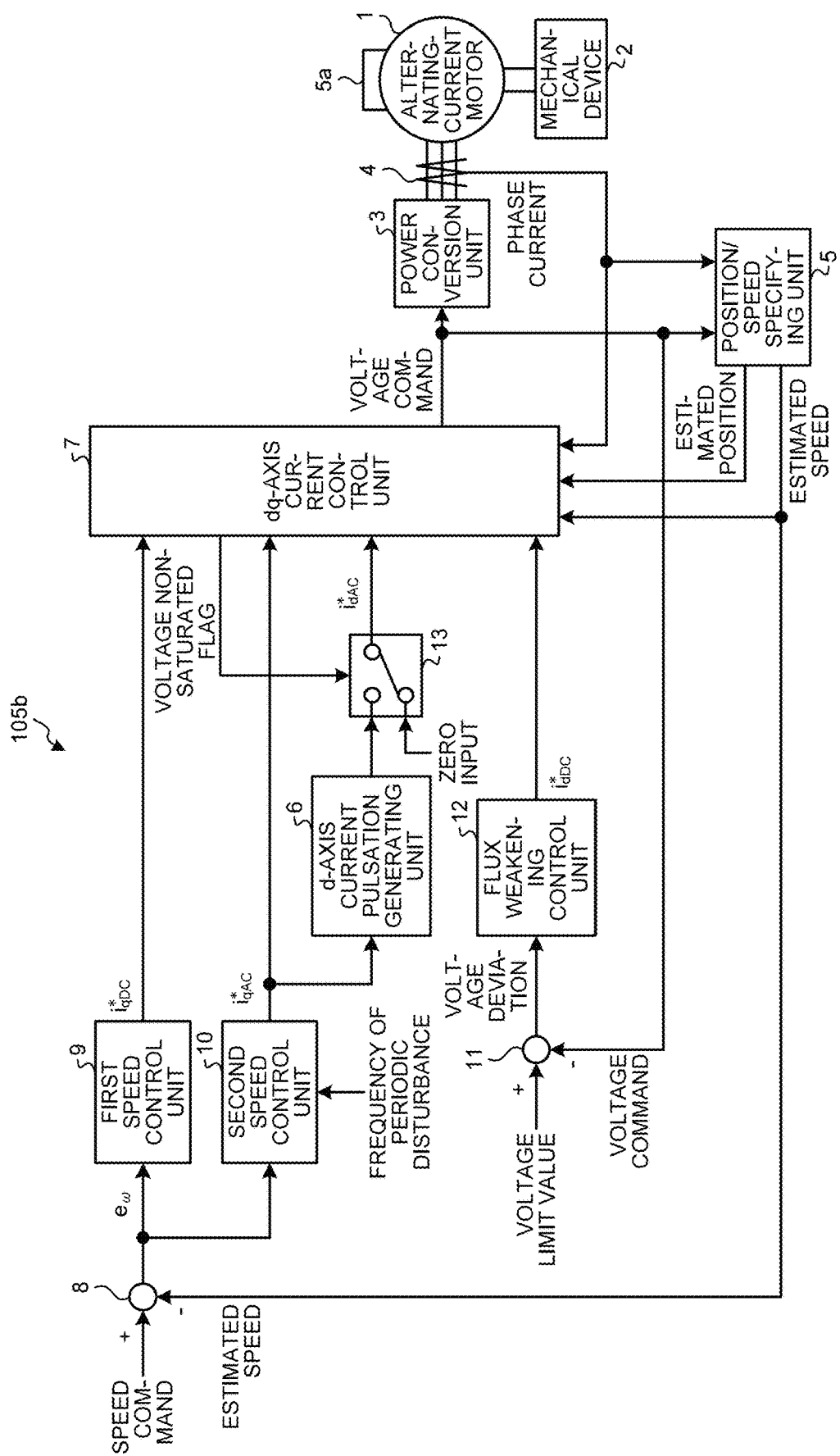
FIG. 15 is a block diagram illustrating an example of a configuration of a motor drive device according to a fourth embodiment.
Figure 16:
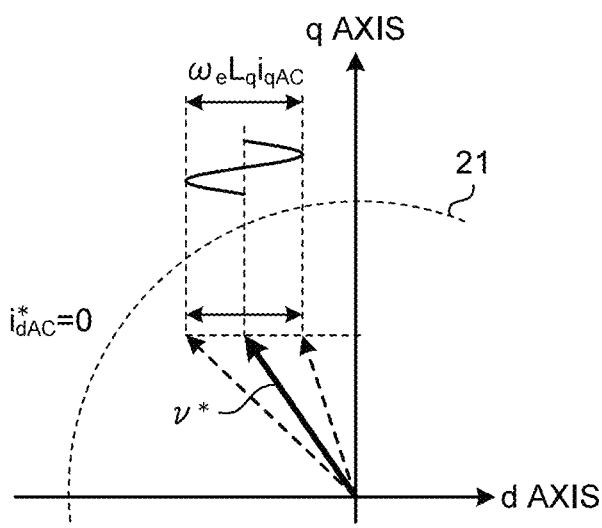
FIG. 16 is a diagram illustrating an example of a voltage vector locus when voltage is not saturated in the motor drive device according to the fourth embodiment.

FIG. 15 is a block diagram illustrating an example of a configuration of a motor drive device 105b according to the fourth embodiment. FIG. 16 is a diagram illustrating an example of a voltage vector locus when the voltage is not saturated in the motor drive device 105b according to the fourth embodiment. Note that the d axis and the locus of the tip of the voltage command vector are illustrated to be parallel in FIG. 16, but are seldom completely parallel in practice. In actual operation, the locus has a certain degree of slope. The locus of the tip of the voltage command vector moves roughly parallel to the d-axis.

The motor drive device 105b is obtained by adding a d-axis current pulsation command selecting unit 13 to the motor drive device 105a of the third embodiment illustrated in FIG. 13. In the fourth embodiment, the dq-axis current control unit 7 includes therein a component (not illustrated) for determining a voltage saturated state and a voltage non-saturated state, and outputs a result of determination as a voltage non-saturated flag to the d-axis current pulsation command selecting unit 13. In the voltage non-saturated state, the d-axis current pulsation command selecting unit 13 forcibly changes the d-axis current pulsation command $i_{dAC}^*$ to zero. In FIG. 15, one input of the d-axis current pulsation command selecting unit 13 is set to zero, but when the d-axis current pulsation command $i_{dAC}^*$ is a minute amount, the purpose of not generating extra d-axis current pulsation $i_{dAC}$ can be achieved. Accordingly, a specified minute amount may be input instead of zero. The minute amount may be referred to as a first value. That is, the d-axis current pulsation command selecting unit 13 selects the d-axis current pulsation command $i_{dAC}^*$ or the first value capable of reducing the loss in the alternating-current motor 1 on the basis of the control of the dq-axis current control unit 7, and outputs the selected d-axis current pulsation command $i_{dAC}^*$ or first value to the dq-axis current control unit 7. When the output voltage of the power conversion unit 3 is under the maximum value, the dq-axis current control unit 7 causes the d-axis current pulsation command selecting unit 13 to output the first value.

As described above, the motor drive device 105b switches the d-axis current pulsation command $i_{dAC}^*$ in the voltage non-saturated state and the voltage saturated state, thereby being able to achieve highly efficient vibration suppression control in either state.

Figure 17:
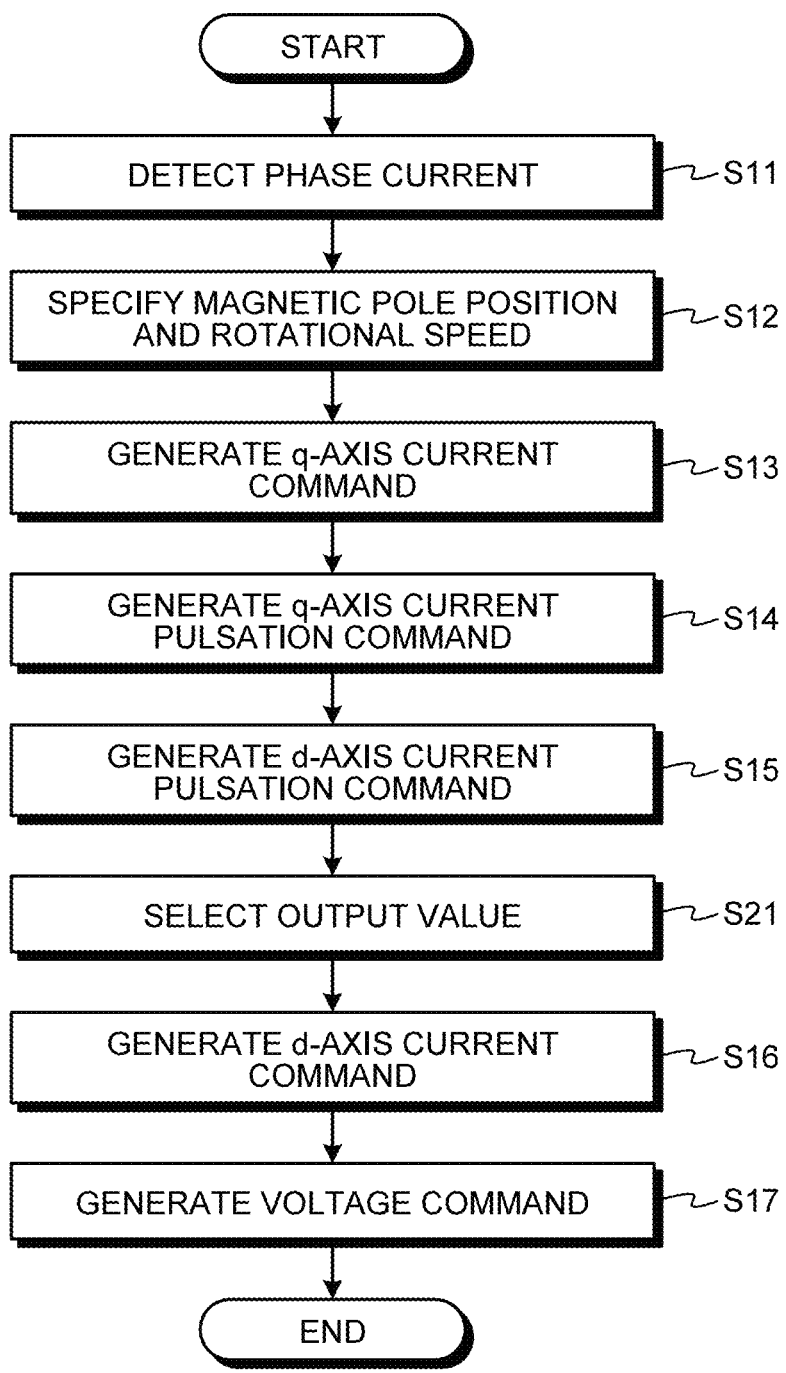
FIG. 17 is a flowchart illustrating an operation of the motor drive device according to the fourth embodiment.

An operation of the motor drive device 105b will be described with reference to a flowchart. FIG. 17 is the flowchart illustrating the operation of the motor drive device 105b according to the fourth embodiment. In the flowchart of FIG. 17, operations other than step S21 are similar to those in the flowchart of the third embodiment illustrated in FIG. 14. In the motor drive device 105b, the d-axis current pulsation command selecting unit 13 selects the d-axis current pulsation command $i_{dAC}^*$ or the first value as the output value to the dq-axis current control unit 7 on the basis of the voltage non-saturated flag from the dq-axis current control unit 7 (step S21).

Note that as for a hardware configuration of the motor drive device 105b, the d-axis current pulsation command selecting unit 13 is implemented by the control circuitry 101 as with the d-axis current pulsation generating unit 6 and the dq-axis current control unit 7 of the motor drive device 105 of the first embodiment.

As described above, according to the present embodiment, in the motor drive device 105b, the d-axis current pulsation command selecting unit 13 selects and outputs the d-axis current pulsation command $i_{dAC}^*$ or the first value on the basis of the voltage non-saturated flag from the dq-axis current control unit 7. The dq-axis current control unit 7 generates the voltage command using the d-axis current pulsation command $i_{dAC}^*$ or the first value. As a result, the motor drive device 105b can improve the motor drive efficiency when the voltage is not saturated as compared to the cases of the first to third embodiments.

Fifth Embodiment

In the fourth embodiment, the d-axis current pulsation command selecting unit 13 switches the d-axis current pulsation command $i_{dAC}^*$ in the voltage non-saturated state and the voltage saturated state. Here, the switching processing is desirably performed seamlessly. A fifth embodiment will describe a case where the d-axis current pulsation command $i_{dAC}^*$ is switched seamlessly.

Figure 18:
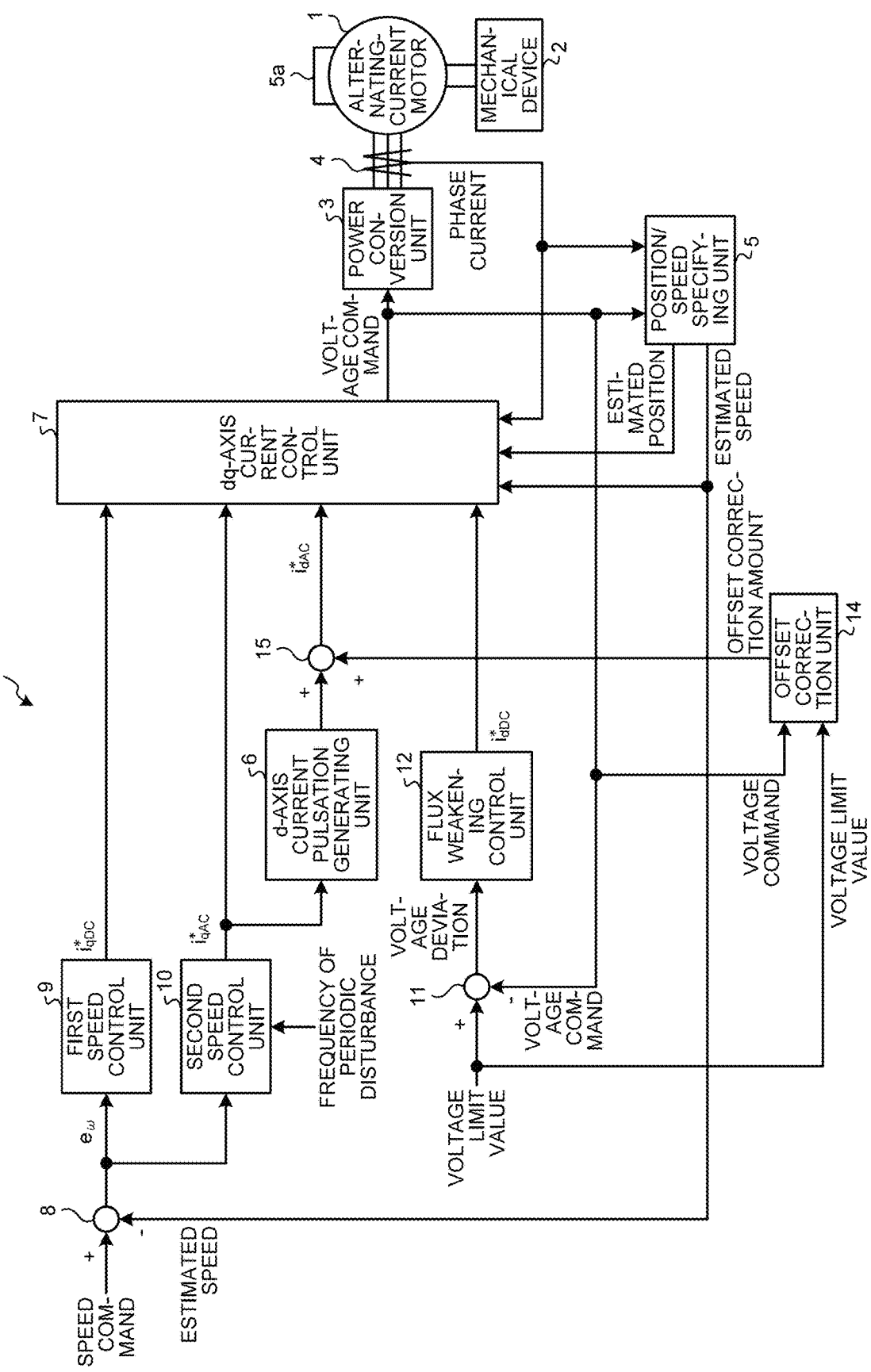
FIG. 18 is a block diagram illustrating an example of a configuration of a motor drive device according to a fifth embodiment.

FIG. 18 is a block diagram illustrating an example of a configuration of a motor drive device 105c according to the fifth embodiment. The motor drive device 105c is obtained by adding an offset correction unit 14 and an addition unit 15 to the motor drive device 105a of the third embodiment illustrated in FIG. 13. The offset correction unit 14 receives the voltage command and the voltage limit value as inputs, and outputs an offset correction amount. That is, the offset correction unit 14 calculates the offset correction amount with respect to the d-axis current pulsation command $i_{dAC}^*$ on the basis of the voltage command and the voltage limit value indicating the maximum voltage that can be output as the voltage command. The addition unit 15 adds the offset correction amount to the d-axis current pulsation command $i_{dAC}^*$ output from the d-axis current pulsation generating unit 6. The addition unit 15 outputs a result of the addition to the dq-axis current control unit 7 as a new d-axis current pulsation command $i_{dAC}^*$. The dq-axis current control unit 7 includes a current limiter (not illustrated), and limits the d-axis current command to an appropriate value when the new d-axis current pulsation command $i_{dAC}^*$ takes a positive value or exceeds a command value calculated by a maximum torque/current control unit (not illustrated).

Figure 19:
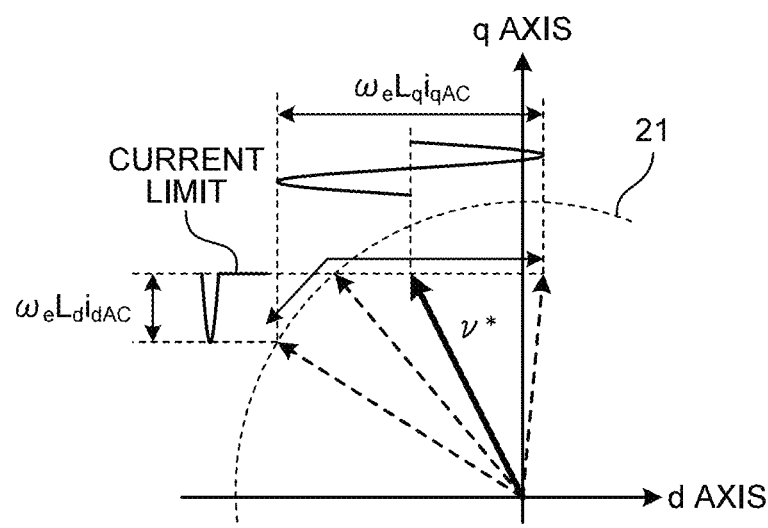
FIG. 19 is a first diagram for explaining the necessity of offset correction performed by the motor drive device according to the fifth embodiment.
Figure 20:
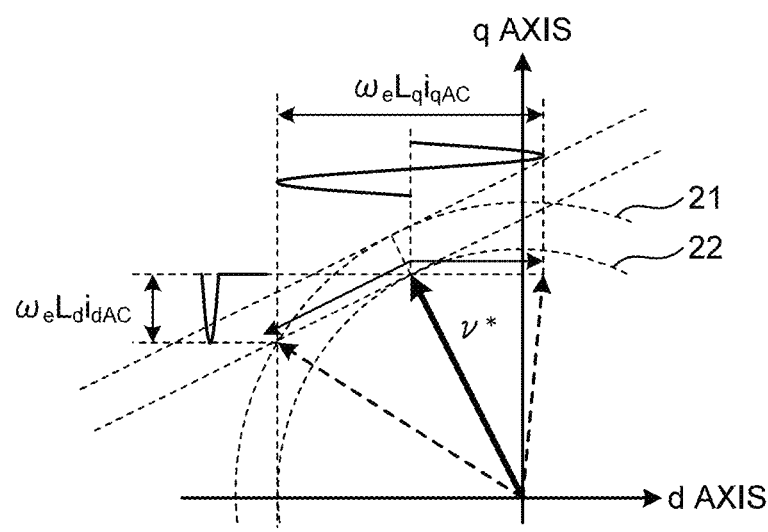
FIG. 20 is a second diagram for explaining the necessity of offset correction performed by the motor drive device according to the fifth embodiment.

Here, a reason for performing offset correction in the motor drive device 105c will be described. FIG. 19 is a first diagram for explaining the necessity of offset correction performed by the motor drive device 105c according to the fifth embodiment. FIG. 20 is a second diagram for explaining the necessity of offset correction performed by the motor drive device 105c according to the fifth embodiment. The first to fourth embodiments have described the locus of the tip of the voltage command vector suitable for the vibration suppression control. As described above, the circumferential locus or the tangential locus is suitable for the vibration suppression control when the voltage is saturated, and the locus parallel to the d-axis is suitable when the voltage is not saturated. From these two matters, in a case where the voltage is slightly saturated, it is conceived that a combination of the circumferential locus and the locus parallel to the d-axis is suitable for the vibration suppression control. FIG. 19 specifically illustrates such a locus. The d-axis current pulsation command $i_{dAC}^*$ at this time has a non-sinusoidal waveform by the above-described current limiting processing. As a method of determining the d-axis current command in the low and middle speed region, $i_d=0$ control, maximum torque/current control, and the like are widely used. It is apparent that the copper loss increases when $i_{dDC}+i_{dAC}^*$ is larger in the positive direction than the command value determined by these control units. Therefore, the d-axis current pulsation command $i_{dAC}^*$ is limited. As a result, the d-axis current pulsation command $i_{dAC}^*$ becomes a non-sinusoidal wave. At first glance, it seems that it is sufficient to simply apply the current limiting processing, but in such a case, the locus illustrated in FIG. 20 is obtained instead of the locus as in FIG. 19. This is because the amplitude of the voltage command vector is not considered in expression (6). When "$v_{ave}$" represents an average amplitude value of the voltage command vector, the locus in FIG. 20 overlaps a tangent of a circle 22 with the radius corresponding to the average amplitude value $v_{ave}^*$. Compared to the locus of FIG. 19, the locus of FIG. 20 has a margin in voltage, and thus it can be said that an extra d-axis current is passed. In other words, the locus of FIG. 19 cannot be achieved unless the d-axis current is reduced by the amount corresponding to the voltage margin. In the present embodiment, the processing of reducing the d-axis current is referred to as the offset correction.

Figure 21:
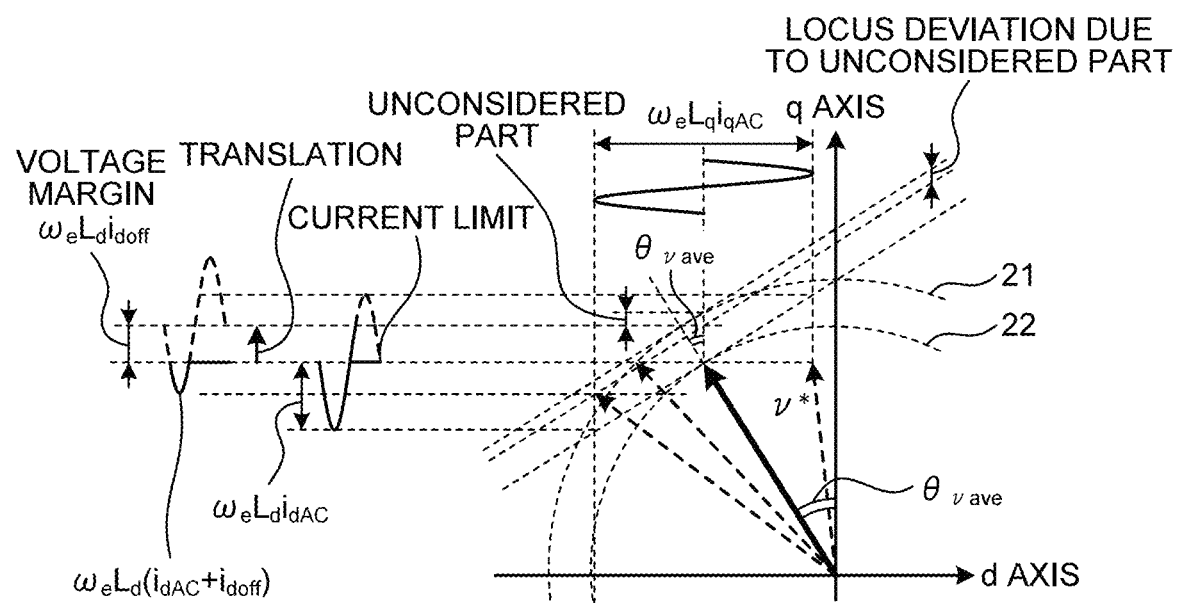
FIG. 21 is a diagram illustrating an example of a method of calculating an offset correction amount in the motor drive device according to the fifth embodiment.

Although various means of the offset correction are conceivable, here, a method focusing on simplicity of calculation rather than geometric strictness will be described. FIG. 21 is a diagram illustrating an example of a method of calculating the offset correction amount in the motor drive device 105c according to the fifth embodiment. An offset correction amount $i_{doff}$ when the average amplitude value $v_{ave}^*$ of mm the voltage command vector has a margin with respect to the limit value $V_{om}$, which is the radius of the voltage limit circle 21, will be considered. When "$\omega_e L_d i_{doff}$" represents a voltage margin amount in the q-axis direction, a relationship of expression (10) can be derived from FIG. 21.

[Expression 10]

$$\omega_e L_d i_{doff} = (V_{om}+v_{ave}^*) \cdot \cos(\theta_{vave}) \quad (10)$$

Depending on the way of thinking, the voltage margin amount is estimated to be small on purpose in expression (10). This is the procedure for canceling an approximation error at the tip in the tangential locus. If it is desired to perform the calculation more strictly, the calculation may be performed by considering a portion written as "unconsidered part" on which "locus deviation due to unconsidered part" is based in FIG. 21.

Expression (11) is obtained by solving expression (10) for the offset correction amount $i_{doff}$.

[Equation 11]

$$i_{doff} = \frac{(V_{om}+v_{ave}^*) \cdot \cos(\theta_{vave})}{\omega_e L_d} \quad (11)$$

When the current limiting processing is performed after translating the d-axis current pulsation $i_{dAC}$ by the offset correction amount $i_{doff}$, a voltage change $\omega_e L_d (i_{qAC}+i_{doff})$ in the q-axis direction with respect to "$\omega_e L_q i_{qAC}$" has a constant limit value except for the vicinity of the peak of the sinusoidal signal in a downward direction. This processing can obtain the locus close to that in FIG. 19. As a result, the vibration suppression control having high efficiency and high performance can be achieved in both the low and middle speed region and the high-speed region.

Figure 22:
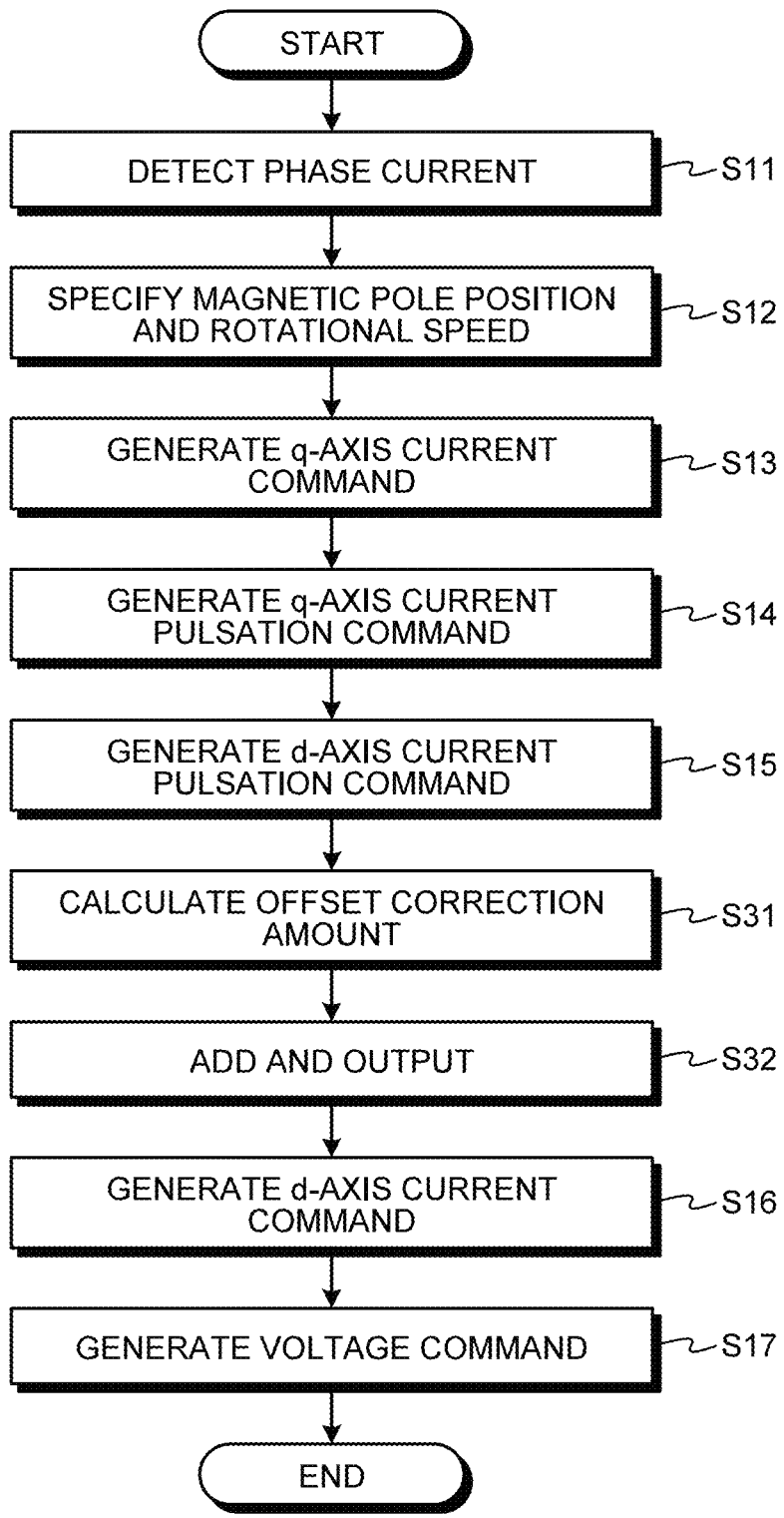
FIG. 22 is a flowchart illustrating an operation of the motor drive device according to the fifth embodiment.

An operation of the motor drive device 105c will be described with reference to a flowchart. FIG. 22 is the flowchart illustrating the operation of the motor drive device 105c according to the fifth embodiment. In the flowchart of FIG. 22, operations other than steps S31 and S32 are similar to those in the flowchart of the third embodiment illustrated in FIG. 14. In the motor drive device 105c, the offset correction unit 14 calculates the offset correction amount with respect to the d-axis current pulsation command $i_{dAC}^*$ on the basis of the voltage command and the voltage limit value (step S31). The addition unit 15 adds the offset correction amount to the d-axis current pulsation command $i_{dAC}^*$ output from the d-axis current pulsation generating unit 6, and outputs a result of the addition to the dq-axis current control unit 7 (step S32).

Note that as for a hardware configuration of the motor drive device 105c, the offset correction unit 14 and the addition unit 15 are implemented by the control circuitry 101 as with the d-axis current pulsation generating unit 6 and the dq-axis current control unit 7 of the motor drive device 105 of the first embodiment.

As described above, according to the present embodiment, the offset correction unit 14 of the motor drive device 105c calculates the offset correction amount with respect to the d-axis current pulsation command $i_{dAC}$. The addition unit 15 adds the offset correction amount to the d-axis current pulsation command $i_{dAC}^*$ and outputs the result of the addition to the dq-axis current control unit 7. As a result, the motor drive device 105c can obtain an effect similar to that of the fourth embodiment, and can also switch the d-axis current pulsation command $i_{dAC}^*$ seamlessly.

Sixth Embodiment

A sixth embodiment will describe a compressor drive system including the motor drive device 105 described in the first embodiment. Note that although the description will be made using the motor drive device 105, the motor drive devices 105a, 105b, and 105c described in the third to fifth embodiments can also be applied.

Figure 23:
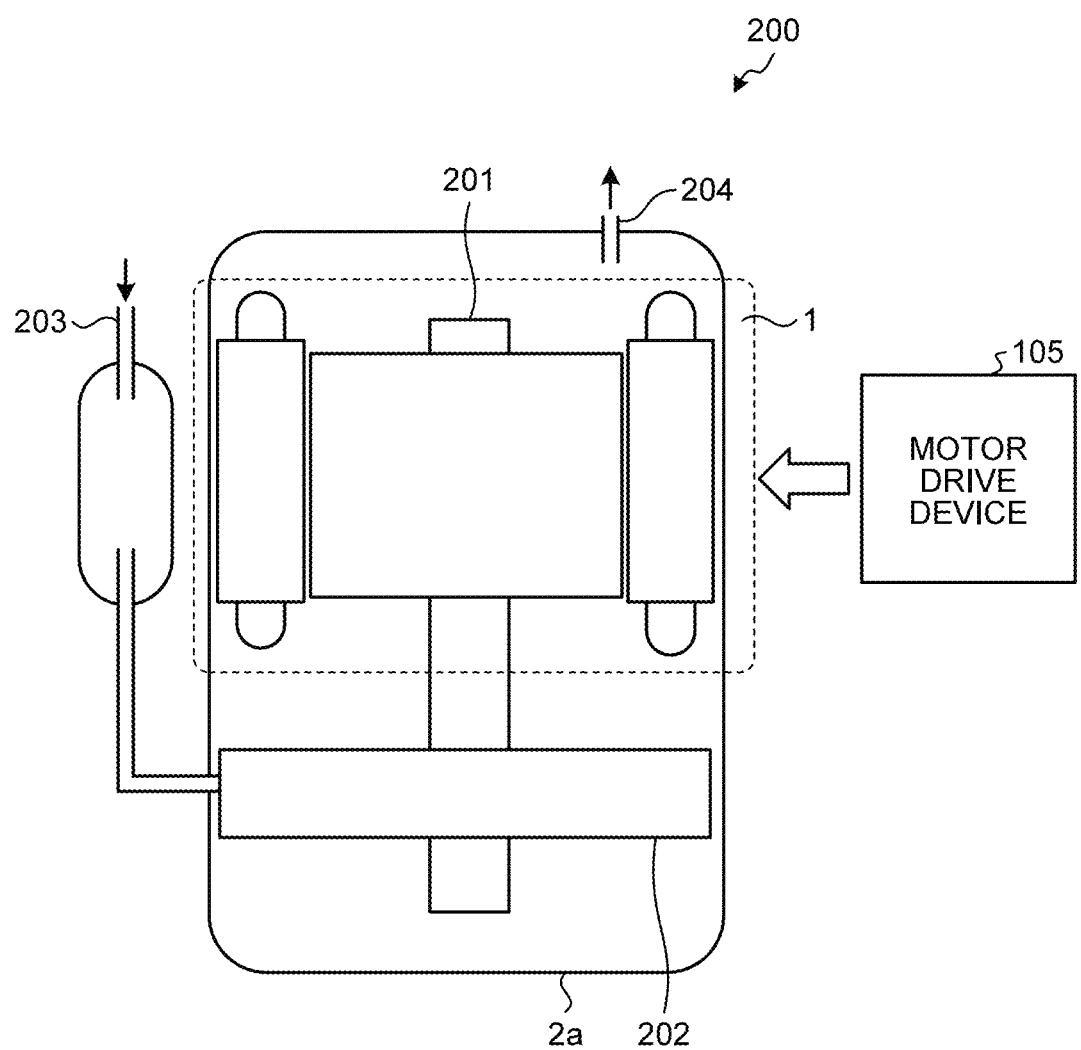
FIG. 23 is a diagram illustrating an example of a configuration of a compressor drive system according to a sixth embodiment.

FIG. 23 is a diagram illustrating an example of a configuration of a compressor drive system 200 according to the sixth embodiment. The compressor drive system 200 includes the motor drive device 105 and a refrigerant compressor 2a. The refrigerant compressor 2a is, for example, a rotary compressor of a type called rolling piston, but may be another type of compressor. The refrigerant compressor 2a includes the alternating-current motor 1, a shaft 201, a compression chamber 202, an intake pipe 203, and a discharge pipe 204. The refrigerant taken in from the intake pipe 203 is compressed by the alternating-current motor 1 in the compression chamber 202 and discharged from the discharge pipe 204. In the refrigerant compressor 2a, the alternating-current motor 1 is structured to be immersed in the refrigerant in many cases, where it is difficult to attach the position sensor 5a to the alternating-current motor 1 because the temperature changes greatly. Therefore, in the application of the refrigerant compressor 2a, the alternating-current motor 1 needs to be driven without a position sensor. Note that the alternating-current motor 1 is driven by the motor drive device 105.

Figure 24:
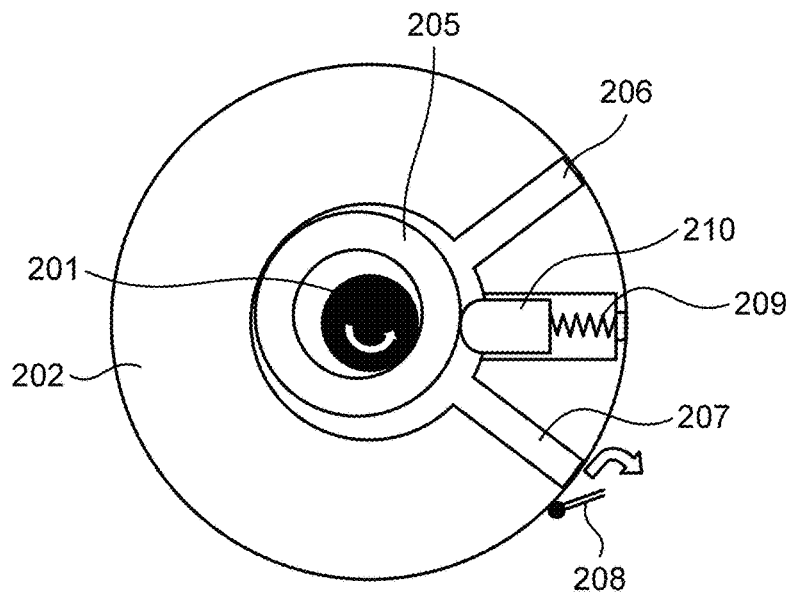
FIG. 24 is a schematic diagram illustrating an example of a detailed configuration of a compression chamber included in the compressor drive system according to the sixth embodiment.

The structure and load torque of the refrigerant compressor 2a will be described. FIG. 24 is a schematic diagram illustrating an example of a detailed configuration of the compression chamber 202 included in the compressor drive system 200 according to the sixth embodiment. The compression chamber 202 includes the shaft 201, a piston 205, a discharge valve 208, a vane 210, a spring 209, a discharge port 207, and an intake port 206. The shaft 201 connects the alternating-current motor 1 and the piston 205. The compression chamber 202 is partitioned into two by the piston 205, the vane 210, and the spring 209. The piston 205 is eccentric, and the volumes on a discharge side and an intake side change depending on the rotational angle. The refrigerant taken in from the intake side is compressed by the piston 205. When the pressure in the compression chamber 202 increases, the discharge valve 208 is opened so that the refrigerant is discharged from the discharge port 207. At the same time as the refrigerant is discharged, the refrigerant flows to the intake side. When the alternating-current motor 1 continues to be rotated, the refrigerant is discharged once per rotation, in the mechanical angle, of the refrigerant compressor 2a.

Figure 25:
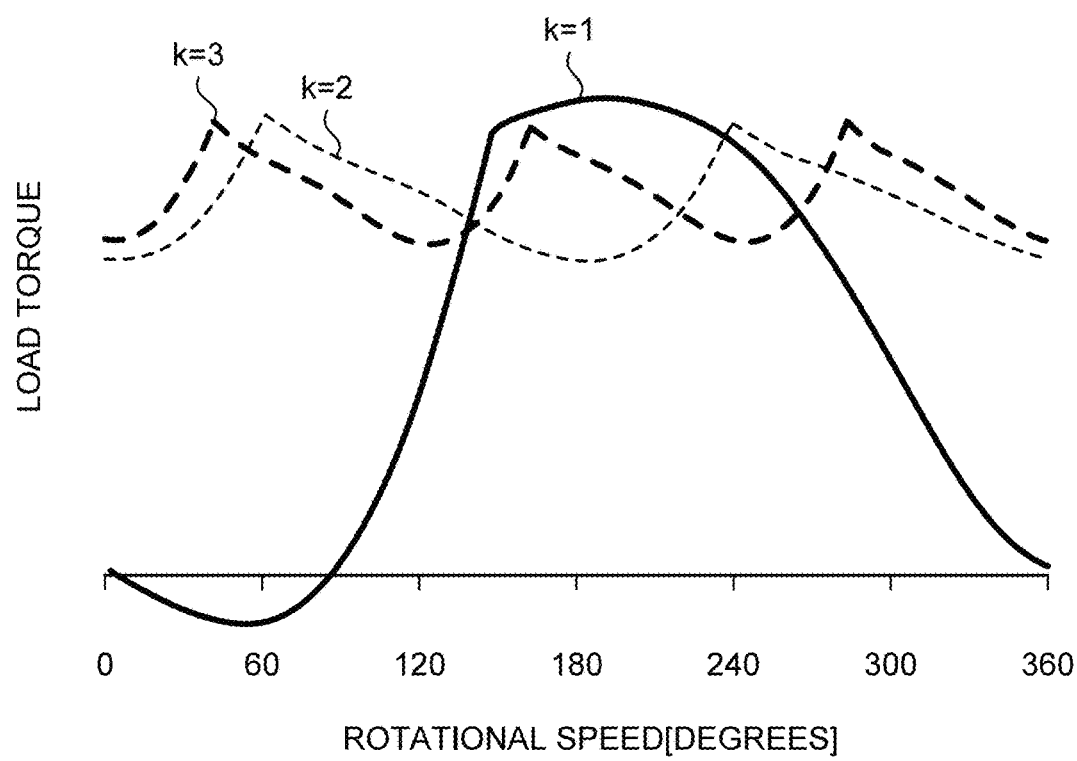
FIG. 25 is a graph illustrating an example of a waveform of load torque of a refrigerant compressor according to the sixth embodiment.

FIG. 25 is a graph illustrating an example of a waveform of the load torque of the refrigerant compressor 2a according to the sixth embodiment. The refrigerant compressor 2a illustrated in FIG. 23 includes only one compression chamber 202, but may include a plurality of compression chambers. Here, the number of compression chambers is represented by "k". When there is only one compression chamber (k=1), the load torque fluctuates greatly in the cycle of mechanical angle. Although second and third harmonics are included in the load torque waveform, the fluctuation due to the first is the largest. When a plurality of compression chambers is provided in the refrigerant compressor 2a, the load torque pulsation can be reduced by shifting the angle of the piston 205. As the number of compression chambers is increased, a waveform with smaller pulsation can be obtained, which however involves a complicated structure and an increase in cost. The cycle of the load torque pulsation is reduced in inverse proportion to the number of compression chambers. When there are two compression chambers (k=2), the second harmonic component increases. When there are three compression chambers (k=3), the third harmonic component increases.

The load torque pulsation of the refrigerant compressor 2a becomes a periodic disturbance to the alternating-current motor 1, and thus is a factor of the speed pulsation. It is generally known that when the speed pulsation is large, noise, vibration, and the like increase.

However, the frequencies of the load torque pulsation, the speed pulsation, and the like are known because the frequencies are determined by the structure of the refrigerant compressor 2a. There is a known case that uses this fact to establish the feedback vibration suppression control. Moreover, in the present embodiment, the motor drive device 105 causes the d-axis current pulsation generating unit 6 to generate the d-axis current pulsation command $i_{dAC}^*$ in synchronization with the q-axis current pulsation $i_{qAC}$. As a result, the motor drive device 105 can achieve the vibration suppression control with high efficiency and high performance in the high-speed region and the overmodulation region. In addition, when the motor drive device 105c is applied, the offset correction unit 14 manages the voltage margin so that the vibration suppression control can be achieved with high efficiency in a wide range from the low-speed region to the high-speed region. Application of the motor drive devices 105, 105a, 105b, and 105c to the compressor drive system 200 can reduce vibration, noise, and the like of the refrigerant compressor 2a under various conditions.

Seventh Embodiment

A seventh embodiment will describe a refrigeration cycle system including the compressor drive system 200 described in the sixth embodiment.

Figure 26:
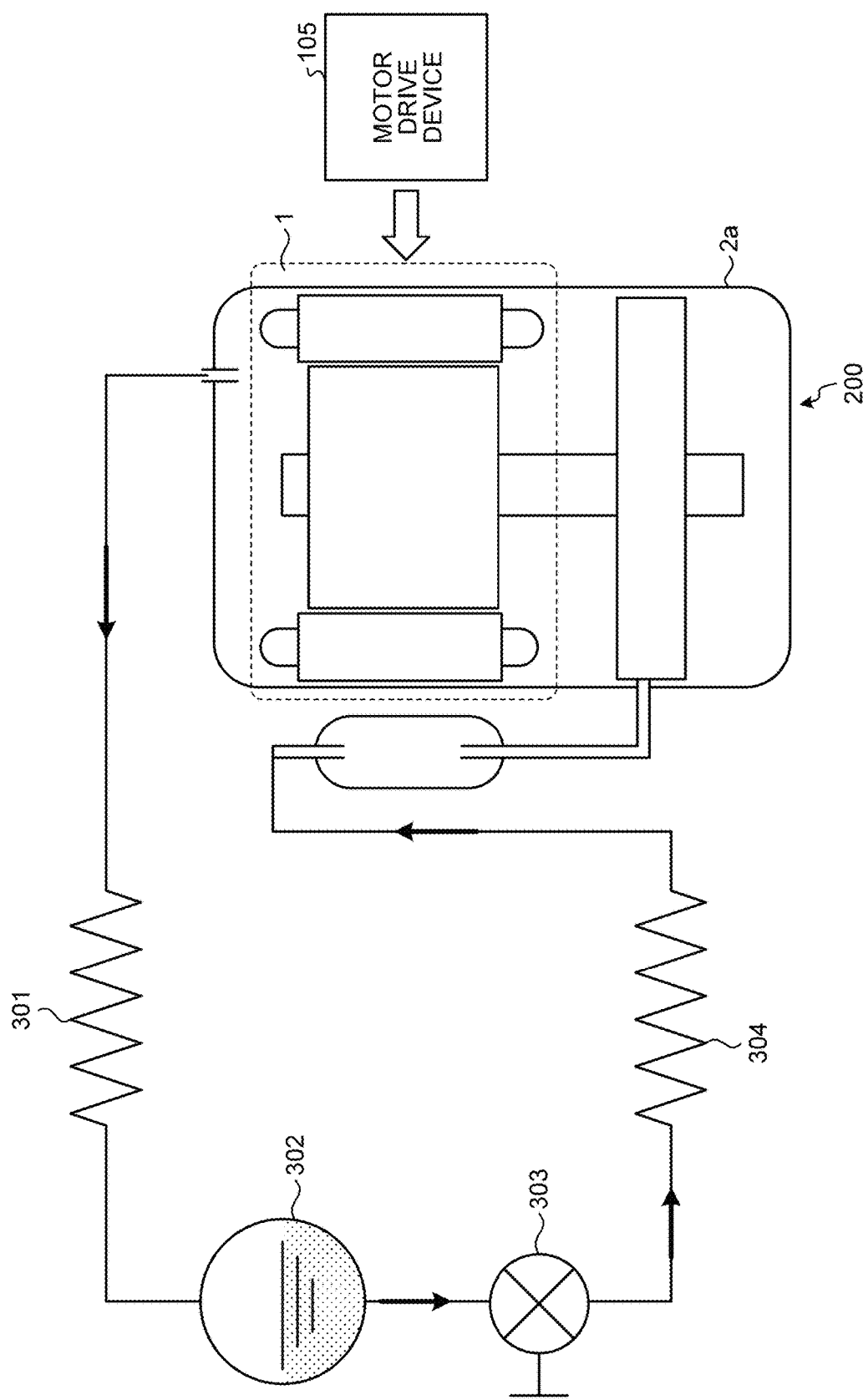
FIG. 26 is a diagram illustrating an example of a configuration of a refrigeration cycle system according to a seventh embodiment.

FIG. 26 is a diagram illustrating an example of a configuration of a refrigeration cycle system 300 according to the seventh embodiment. The refrigeration cycle system 300 includes the compressor drive system 200, a condenser 301, a liquid receiver 302, an expansion valve 303, and an evaporator 304. The refrigerant compressor 2a of the compressor drive system 200, the condenser 301, the liquid receiver 302, the expansion valve 303, and the evaporator 304 are connected by piping so that the refrigerant circulates. The refrigeration cycle system 300 transfers heat while allowing the refrigerant to repeat phase changes from liquid to gas and from gas to liquid through circulation in the processes of evaporation, compression, condensation, and expansion.

The role of each device will be described. The evaporator 304 evaporates the refrigerant liquid at a low pressure, takes heat from the surroundings, and performs a cooling action. The refrigerant compressor 2a compresses the refrigerant gas into high-pressure gas in order to condense the refrigerant. The refrigerant compressor 2a is driven by the motor drive device 105. The condenser 301 releases heat and condenses the high-pressure refrigerant gas into the refrigerant liquid. The expansion valve 303 performs throttle expansion on the refrigerant liquid and turns it into low-pressure liquid in order to evaporate the refrigerant. The liquid receiver 302 is provided for adjusting the amount of the refrigerant circulating, and may be omitted in a small system.

Because the vibration generated by the refrigerant compressor 2a causes breakage of the refrigerant piping, noise, and the like, the alternating-current motor 1 needs to be controlled so as to minimize the vibration. As the feedback vibration suppression control technique in the low and middle speed region has been widely studied to be gradually established and spread, the vibration suppression control in the high-speed region has become required. In the high-speed region, the output voltage of the power conversion unit 3 is saturated so that proper torque control cannot be performed. In order to perform the vibration suppression control in the high-speed region, the flux weakening control needs to be used together. However, as described above, the existing flux weakening control method has a problem with robustness and low control responsiveness. It has thus been considered difficult to perform the vibration suppression control in the high-speed region. A method is conceivable in which "extra d-axis current is always passed to secure a voltage margin for the vibration suppression control", which however is unrealistic because energy saving performance is also considered to be important in the refrigeration cycle system 300.

For these reasons, in order to achieve the vibration suppression control in the high-speed region, it is necessary to review not only the technique of the vibration suppression control but also the method regarding the flux weakening control. The motor drive devices 105 to 105c solve the above problem. The motor drive devices 105 to 105c have the mechanism for causing the d-axis current pulsation in synchronization with the q-axis current pulsation generated by the vibration suppression control unit. The motor drive devices 105 to 105c separate the q-axis current into the "low frequency component including the direct current component" and the "high frequency component", and perform the flux weakening control separately. The motor drive devices 105 to 105c can thus achieve the vibration suppression control with high efficiency and high performance in the high-speed region that has been difficult. This as a result can reduce the cost of measures against breakage of the refrigerant piping, noise, and the like and reduce the cost of the refrigeration cycle system 300.

The configuration illustrated in the above embodiment merely illustrates an example of the content of the present invention, and can thus be combined with another known technique or partially omitted and/or modified without departing from the scope of the present invention.

REFERENCE SIGNS LIST 1 alternating-current motor; 2 mechanical device; 2a refrigerant compressor; 3 power conversion unit; 4 current detection unit; 5 position/speed specifying unit; 5a position sensor; 6 d-axis current pulsation generating unit; 7 dq-axis current control unit; 8, 11 subtraction unit; 9 first speed control unit; 10 second speed control unit; 12 flux weakening control unit; d-axis current pulsation command selecting unit; 14 offset correction unit; 15 addition unit; 101 control circuitry; 105, 105a, 105b, 105c motor drive device; 200 compressor drive system; 300 refrigeration cycle system.

The invention claimed is:

1. A motor drive device that controls driving of an alternating-current motor connected to a mechanical device with periodic load torque pulsation by using dq rotating coordinates, the motor drive device comprising:
   a power converter to convert a direct current voltage into an alternating current voltage on the basis of a voltage command, and output the alternating current voltage to the alternating-current motor;
   a current detector to detect a phase current flowing to the alternating-current motor;
   a sensor to specify a magnetic pole position and a rotational speed of the alternating-current motor;
   control circuitry
   to generate a d-axis current pulsation command on the basis of periodic q-axis current pulsation or a periodic q-axis current pulsation command, the d-axis current pulsation command being in synchronization with the q-axis current pulsation or the q-axis current pulsation command and preventing or reducing an increase or decrease in amplitude of the voltage command; and
   to generate the voltage command that controls the phase current on the dq rotating coordinates, which rotate in synchronization with the magnetic pole position, by using the magnetic pole position, the rotational speed, the phase current, the q-axis current pulsation or the q-axis current pulsation command, and the d-axis current pulsation command, wherein
   the control circuitry generates the d-axis current pulsation command such that a locus of a vector of the voltage command is maintained in a circumferential direction or a tangential direction of a voltage limit circle having a specified radius.

2. The motor drive device according to claim 1, wherein the control circuitry generates the d-axis current pulsation command on the basis of a result of multiplication of a tangent of an average value of a voltage advance angle and the q-axis current pulsation or the q-axis current pulsation command.

3. The motor drive device according to claim 1, wherein the control circuitry generates a q-axis current command that has a lower frequency than the q-axis current pulsation or the q-axis current pulsation command and controls an average speed of the alternating-current motor;
   the control circuitry generates the q-axis current pulsation command that suppresses speed pulsation caused by the load torque pulsation; and
   the control circuitry generates a d-axis current command that has a lower frequency than the d-axis current pulsation command and maintains the amplitude of the voltage command to be less than or equal to a specified value, wherein
   the control circuitry generates the d-axis current pulsation command on the basis of the q-axis current pulsation command, the d-axis current pulsation command being in synchronization with the q-axis current pulsation command and preventing or reducing an increase or decrease in the amplitude of the voltage command, and
   the control circuitry generates the voltage command using the magnetic pole position, the rotational speed, the phase current, the q-axis current command, the q-axis current pulsation command, the d-axis current pulsation command, and the d-axis current command.

4. The motor drive device according to claim 1, wherein the control circuitry selects and generates, to the control circuitry, the d-axis current pulsation command or a first value that can reduce a loss in the alternating-current motor on the basis of control of the control circuitry, wherein
   the control unit control circuitry causes the d-axis current pulsation command selecting unit to output the first value when an output voltage of the power converter is under a maximum value.

5. The motor drive device according to claim 1, wherein the control circuitry calculates an offset correction amount with respect to the d-axis current pulsation command on the basis of the voltage command and a voltage limit value indicating a maximum voltage that can be output as the voltage command; and
   adds the offset correction amount to the d-axis current pulsation command output from the control circuitry, and output a result of the addition.

6. A compressor drive system comprising the motor drive device according to claim 1.

7. A refrigeration cycle system comprising the compressor drive system according to claim 6.

* * * * *